(12) United States Patent
Gibbons et al.

(10) Patent No.: US 9,657,894 B2
(45) Date of Patent: May 23, 2017

(54) MOUNTING CLIPS AND ADAPTERS FOR MOUNTING DECORATIVE ARTICLES

(71) Applicant: Gibbons Innovations, Inc., Lincoln, DE (US)

(72) Inventors: Christopher J. Gibbons, Lincoln, DE (US); Jeffrey S. Gibbons, Lincoln, DE (US)

(73) Assignee: Gibbons Innovations, Inc., Lincoln, DE (US)

( * ) Notice: Subject to any disclaimer, the term of this patent is extended or adjusted under 35 U.S.C. 154(b) by 0 days.

(21) Appl. No.: 14/773,392

(22) PCT Filed: Mar. 12, 2014

(86) PCT No.: PCT/US2014/024081
§ 371 (c)(1),
(2) Date: Sep. 8, 2015

(87) PCT Pub. No.: WO2014/165000
PCT Pub. Date: Oct. 9, 2014

(65) Prior Publication Data
US 2016/0025263 A1     Jan. 28, 2016

Related U.S. Application Data

(60) Provisional application No. 61/777,565, filed on Mar. 12, 2013.

(51) Int. Cl.
*F16M 13/00* (2006.01)
*F16M 13/02* (2006.01)
(Continued)

(52) U.S. Cl.
CPC ........... *F16M 13/022* (2013.01); *A47G 7/044* (2013.01); *F16B 2/005* (2013.01); *F16B 2/08* (2013.01);
(Continued)

(58) Field of Classification Search
USPC ................... 248/156, 530, 507, 508
See application file for complete search history.

(56) References Cited

U.S. PATENT DOCUMENTS

| | | |
|---|---|---|
| 884,256 A | 4/1908 | Addie |
| 2,544,817 A | 3/1951 | White |

(Continued)

FOREIGN PATENT DOCUMENTS

| | | |
|---|---|---|
| CN | 86204610 U | 4/1987 |
| CN | 1128416 A | 8/1996 |

(Continued)

OTHER PUBLICATIONS

Int'l Preliminary Report on Patentability issued Sep. 15, 2015 in Int'l Application No. PCT/US2014/024107.

(Continued)

*Primary Examiner* — Steven Marsh
(74) *Attorney, Agent, or Firm* — Panitch Schwarze Belisario & Nadel LLP

(57) ABSTRACT

Mounting clips (10, 100, 200, 300, 400, 500, 600, 700, 800, 900, 1000, 1100, 1200, 1200, 1300, 1400, 1500, 1600) removably engage to vertically disposed mounting surfaces, such as rain gutter downspouts, and support decorative articles for display. The mounting clips include a frame having arms (14, 814, 914, 1014) configured for attachment to a profiled outer surface of the mounting surface. Optional adapters (870) removably engage to the arms when clips are attached to non-standard diameter mounting surfaces. Length-adjusting clip arms (1014, 1084) or straps (970) may join to the frame of the clips. Or, the arms may be replaced by straps (1176, 1182, 1276, 1282, 1376, 1382, 1476, 1482, 1576, 1582). Decorative articles are joined or appended to a blank (44, 1644) that is slidably engageable with the central portion of the mounting clip. The blank (1644) may include (Continued)

frictional or locking engagement structure (1650, 1686, 1696).

6 Claims, 17 Drawing Sheets

(51) Int. Cl.
    *F16B 2/22*     (2006.01)
    *F16B 7/04*     (2006.01)
    *F16B 2/00*     (2006.01)
    *F16B 2/08*     (2006.01)
    *F16B 2/12*     (2006.01)
    *A47G 7/04*     (2006.01)

(52) U.S. Cl.
    CPC ............... *F16B 2/12* (2013.01); *F16B 2/22* (2013.01); *F16B 7/0473* (2013.01); *F16M 13/02* (2013.01)

(56) References Cited

U.S. PATENT DOCUMENTS

| | | | |
|---|---|---|---|
| 2,599,303 A | 6/1952 | Ward | |
| 2,869,812 A | 1/1959 | Hamel | |
| 3,747,166 A | 7/1973 | Eross | |
| 3,800,370 A | 4/1974 | Courtright | |
| 3,983,602 A | 10/1976 | Barry | |
| D257,948 S | 1/1981 | Klingensmith | |
| 4,251,844 A | 2/1981 | Horstmann | |
| 4,406,434 A | 9/1983 | Schneckloth | |
| 4,452,836 A | 6/1984 | Daniel, Jr. | |
| 4,458,873 A | 7/1984 | Sutherland | |
| 4,624,431 A | 11/1986 | Pfeifer | |
| 4,844,121 A | 7/1989 | Duke | |
| 4,880,133 A | 11/1989 | Cullinane | |
| 4,903,929 A | 2/1990 | Hoffman | |
| 4,974,804 A | 12/1990 | Thompson et al. | |
| 4,991,803 A | 2/1991 | Buder | |
| 5,074,419 A | 12/1991 | Smith | |
| 5,188,318 A | 2/1993 | Newcomer et al. | |
| 5,388,377 A | 2/1995 | Faulkner | |
| 5,452,743 A | 9/1995 | Rortvedt | |
| 5,496,112 A * | 3/1996 | Browne | A01G 25/167 159/32 |
| 5,566,058 A | 10/1996 | Protz, Jr. | |
| 5,595,439 A | 1/1997 | Maddock et al. | |
| 5,642,819 A | 7/1997 | Ronia | |
| 5,697,591 A | 12/1997 | Cooper | |
| 5,772,166 A | 6/1998 | Adams | |
| 5,794,384 A | 8/1998 | Dean et al. | |
| 5,871,306 A | 2/1999 | Tilcox | |
| 5,881,495 A * | 3/1999 | Clark | A01G 9/12 135/118 |
| 5,893,239 A | 4/1999 | Leahy | |
| 6,012,691 A | 1/2000 | van Leeuwen et al. | |
| 6,109,765 A | 8/2000 | Blanton | |
| 6,206,613 B1 | 3/2001 | Elkins | |
| 6,247,205 B1 | 6/2001 | Damadian et al. | |
| 6,336,599 B1 * | 1/2002 | Herr | B05B 15/0443 239/505 |
| 6,338,460 B1 | 1/2002 | Rumpel | |
| 6,461,084 B1 * | 10/2002 | Stuart | E04H 12/2215 248/156 |
| 6,494,411 B1 | 12/2002 | Bjorklund | |
| 6,494,594 B1 | 12/2002 | Schroetter | |
| 6,513,772 B2 | 2/2003 | Gary et al. | |
| 6,619,596 B1 | 9/2003 | Caine et al. | |
| 6,644,836 B1 | 11/2003 | Adams | |
| 6,663,069 B1 | 12/2003 | Norberg | |
| 6,799,744 B1 | 10/2004 | Koistinen | |
| 7,059,749 B1 | 6/2006 | Bernier | |
| 7,188,977 B1 | 3/2007 | Lough | |
| 7,341,230 B2 | 3/2008 | Beaudry | |
| 7,578,486 B1 | 8/2009 | Taylor | |
| 7,621,486 B1 | 11/2009 | Barrepski | |
| 8,020,825 B2 | 9/2011 | Dostaler et al. | |
| 8,272,613 B2 | 9/2012 | Golle et al. | |
| 8,356,778 B2 | 1/2013 | Birli et al. | |
| 8,360,378 B1 | 1/2013 | Owens | |
| 8,464,464 B2 * | 6/2013 | Rosaen | 47/33 |
| 8,960,616 B2 | 2/2015 | Gibbons et al. | |
| 9,127,805 B2 | 9/2015 | Gibbons et al. | |
| 2005/0160681 A1 | 7/2005 | Boelling | |
| 2008/0011907 A1 | 1/2008 | Jacobsma | |
| 2008/0078793 A1 | 4/2008 | Brown | |
| 2008/0258020 A1 * | 10/2008 | Chen | A45F 3/44 248/156 |
| 2009/0121107 A1 | 5/2009 | Lagobi | |
| 2010/0001152 A1 | 1/2010 | Golle et al. | |
| 2010/0118554 A1 | 5/2010 | Kraus, Jr. et al. | |
| 2010/0193655 A1 | 8/2010 | Fleischman | |
| 2011/0108150 A1 | 5/2011 | Renaud | |
| 2012/0298813 A1 | 11/2012 | Gibbons et al. | |
| 2013/0086777 A1 | 4/2013 | McLaughlin et al. | |
| 2013/0333197 A1 | 12/2013 | Schulte et al. | |

FOREIGN PATENT DOCUMENTS

| | | |
|---|---|---|
| CN | 2345766 Y | 10/1999 |
| CN | 2445670 Y | 9/2001 |
| CN | 2541949 Y | 3/2003 |
| CN | 2762953 Y | 3/2006 |
| CN | 2934893 Y | 8/2007 |
| CN | 201246370 Y | 5/2009 |
| CN | 102052369 A | 5/2011 |
| CN | 102067389 A | 5/2011 |
| CN | 202044072 U | 11/2011 |
| CN | 202372335 U | 8/2012 |
| CN | 104827418 A | 8/2015 |
| EP | 0801257 A1 | 10/1997 |
| GB | 600120 A | 3/1948 |
| GB | 2293501 A | 3/1996 |
| KR | 10-1171694 B1 | 8/2012 |
| WO | 2012162453 A2 | 11/2012 |
| WO | 2014165000 A1 | 10/2014 |
| WO | 2014165006 A1 | 10/2014 |

OTHER PUBLICATIONS

Int'l Preliminary Report on Patentability issued Sep. 15, 2015 in Int'l Application No. PCT/US2014/024081.
Int'l Search Report and Written Opinion issued Jul. 24, 2014 in Int'l Application No. PCT/US2014/024107.
Office Action issued Aug. 13, 2014 in U.S. Appl. No. 13/478,194.
Int'l Search Report and Written Opinion issued Aug. 26, 2014 in Int'l Application No. PCT/US2014/024081.
Office Action issued Dec. 4, 2014 in U.S. Appl. No. 14/298,429 by Gibbons.
Office Action issued Dec. 2, 2014 in CN Application No. 201280025145.6.
Office Action issued Jul. 13, 2016 in CN Application No. 201480024937.0.
Office Action issued Mar. 28, 2016 in CN Application No. 201480014463.1.
Int'l Preliminary Report on Patentability issued Dec. 5, 2013 in Int'l Application No. PCT/US2012/039257.
Extended Search Report issued May 8, 2016 in EP Application No. 14778424.3.

* cited by examiner

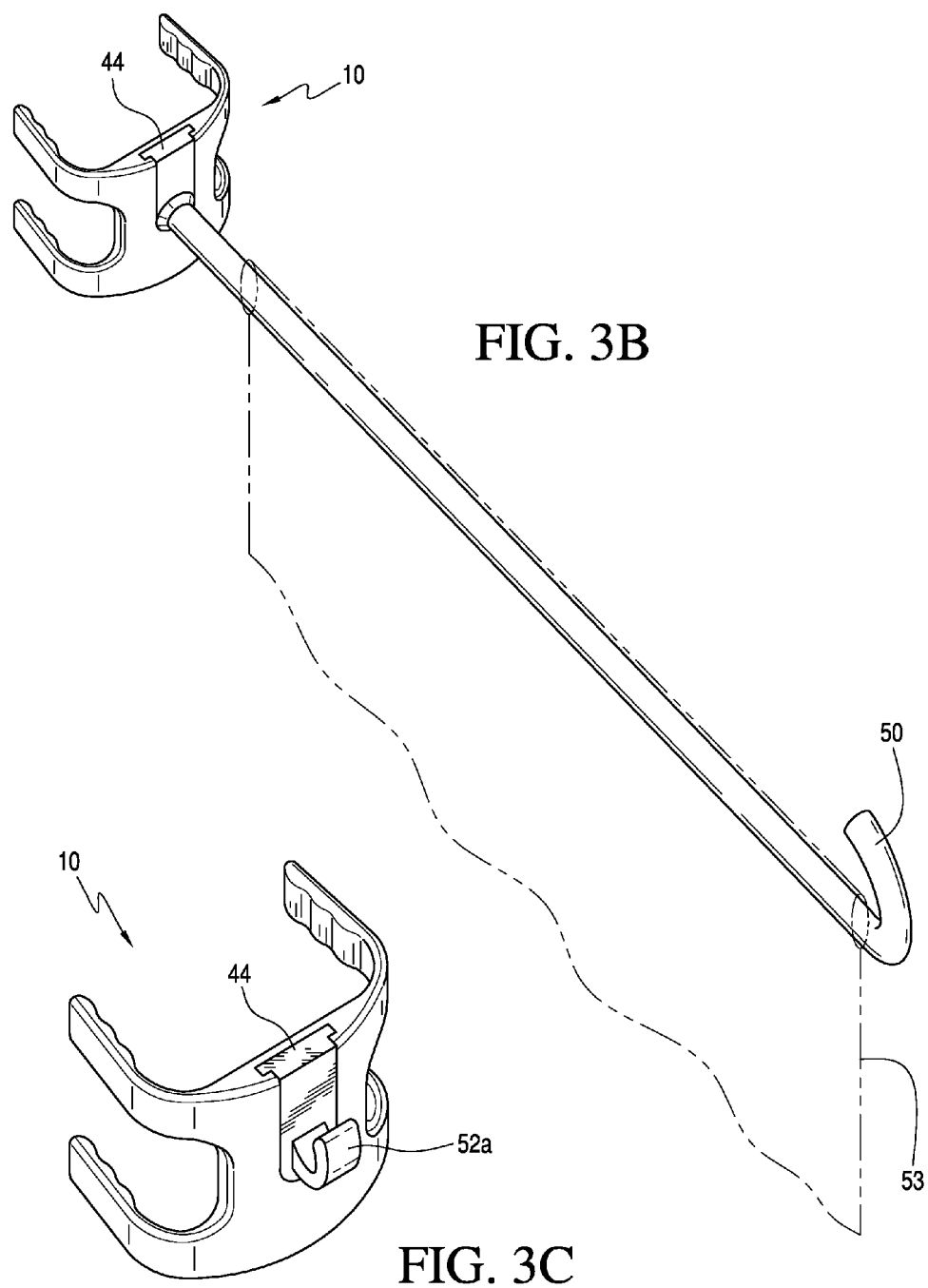

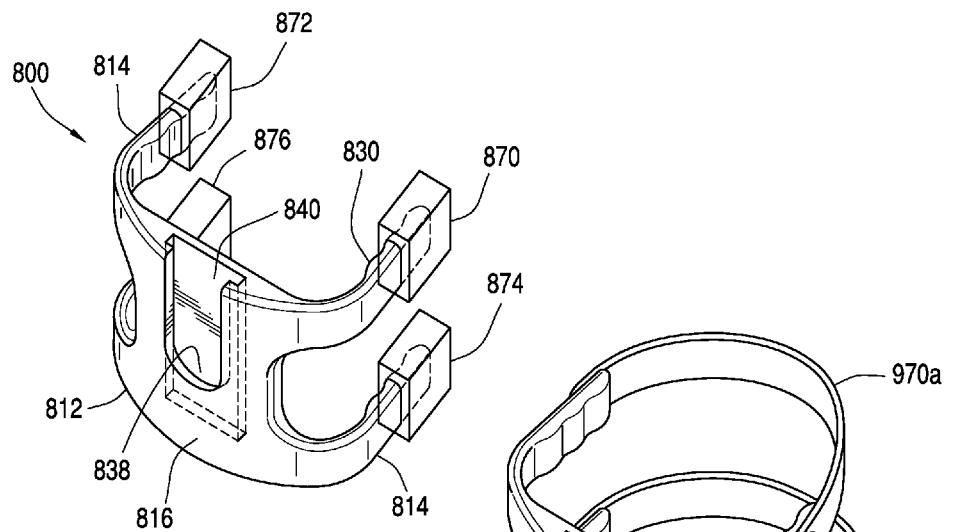
FIG. 13
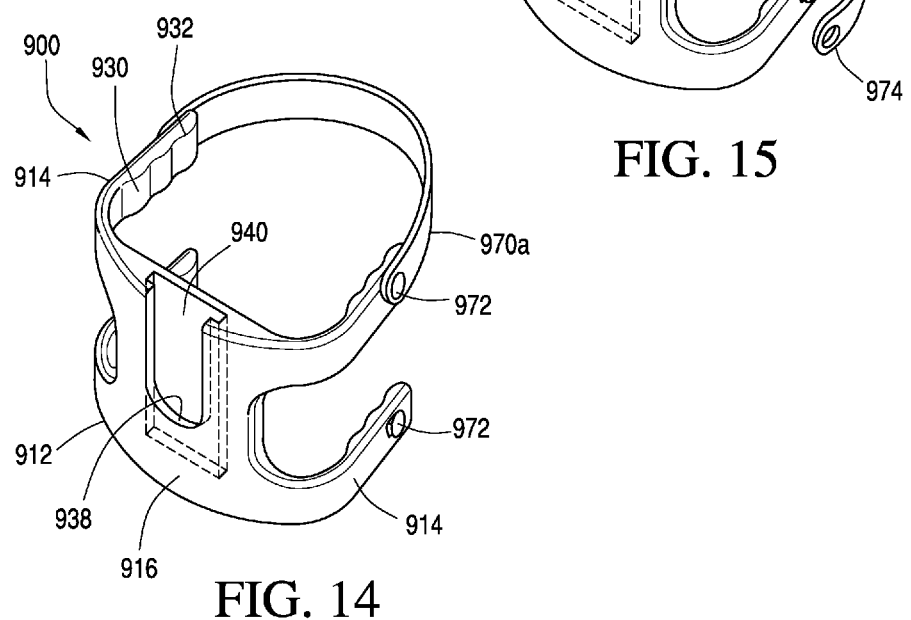
FIG. 15
FIG. 14

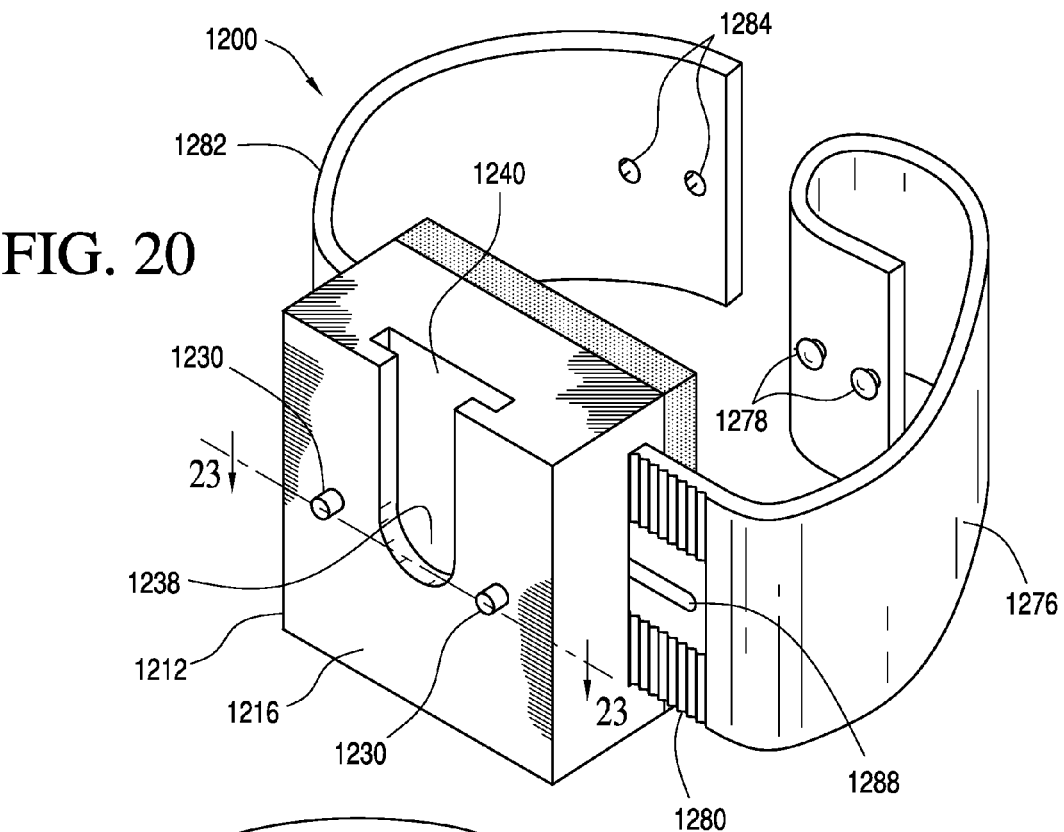
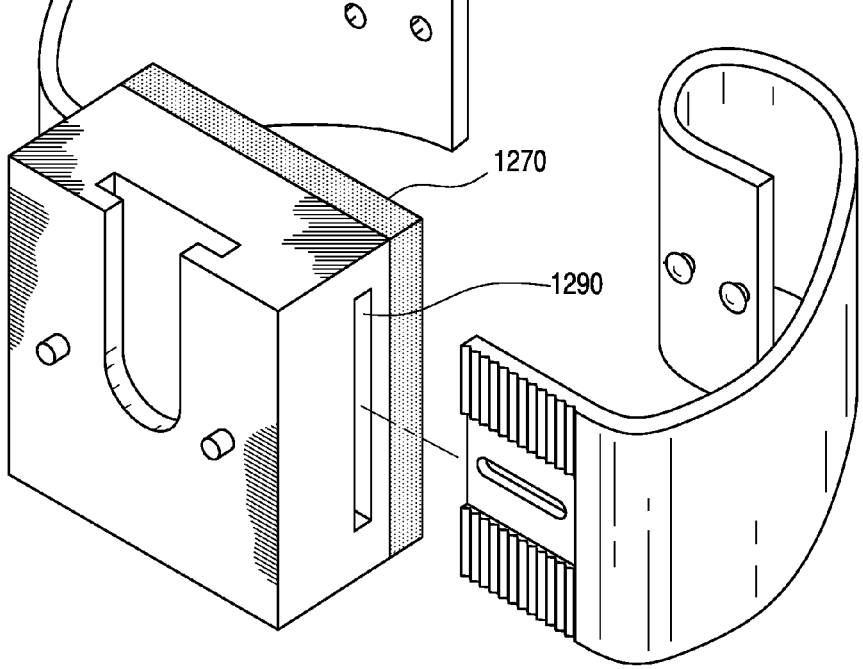

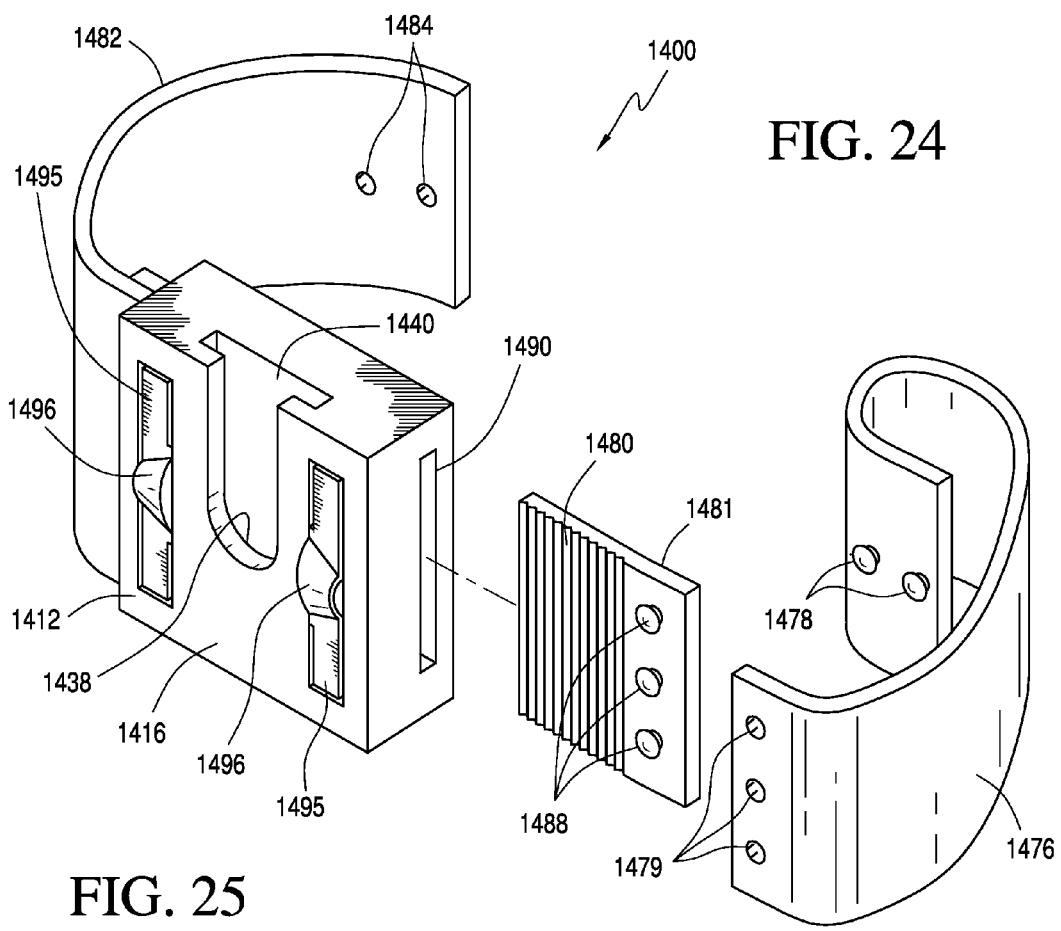
FIG. 24
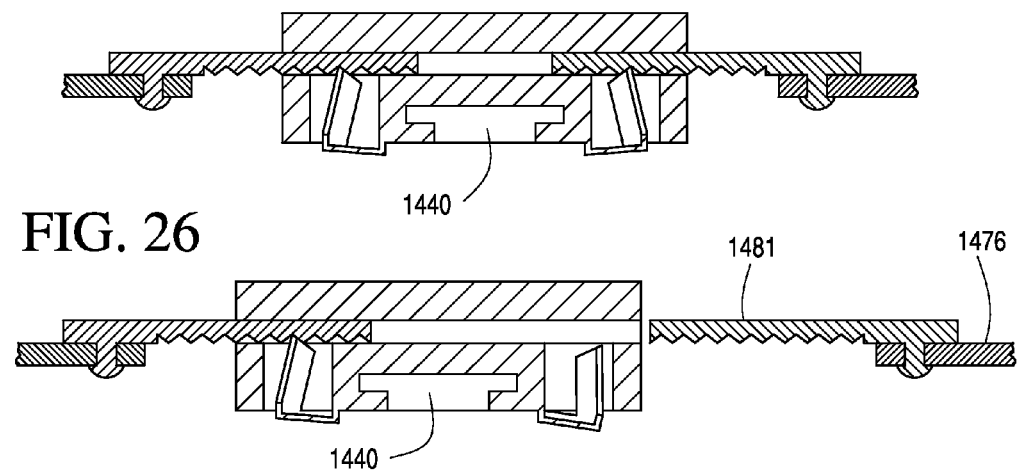
FIG. 25
FIG. 26

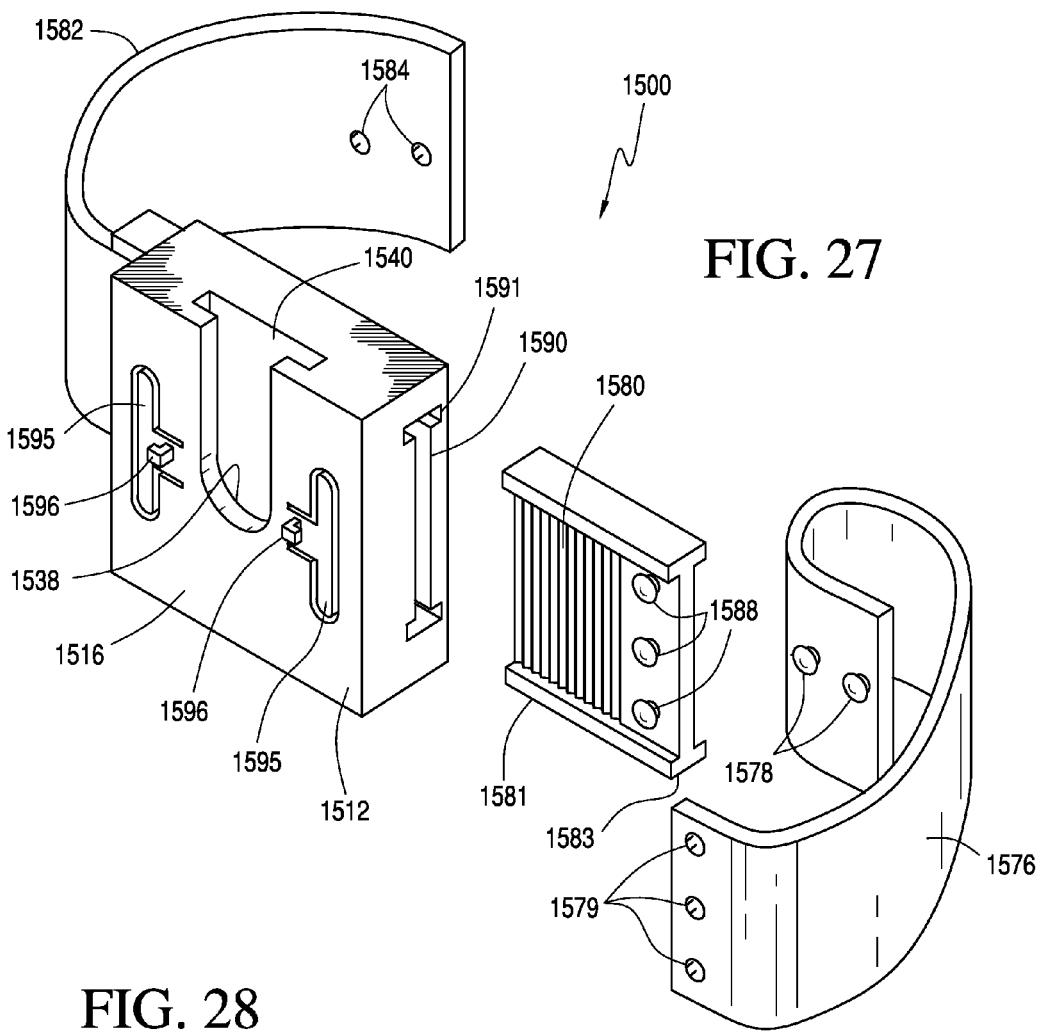
FIG. 27
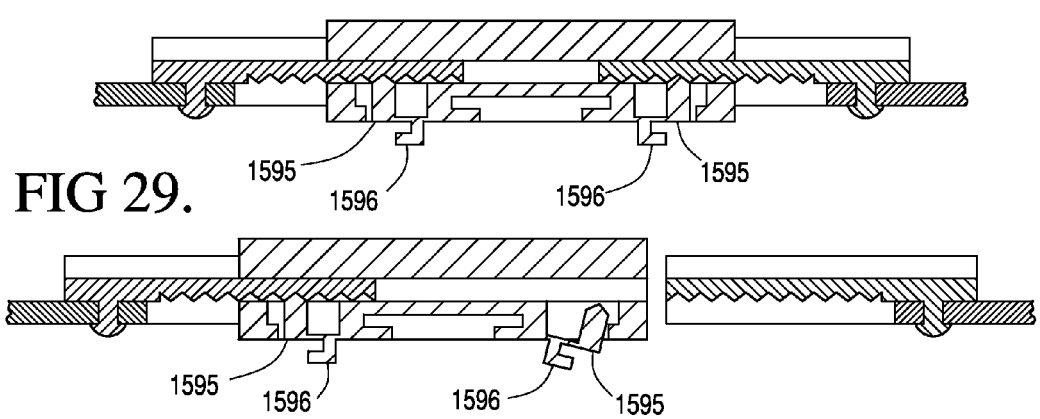
FIG. 28
FIG 29.

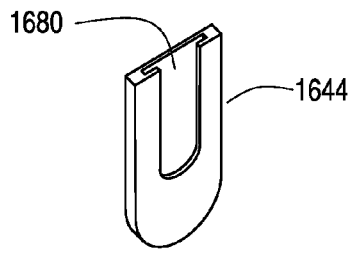
FIG. 32
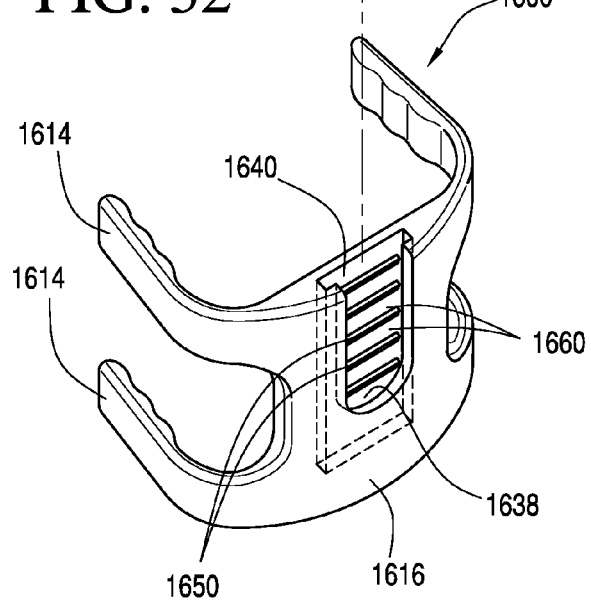
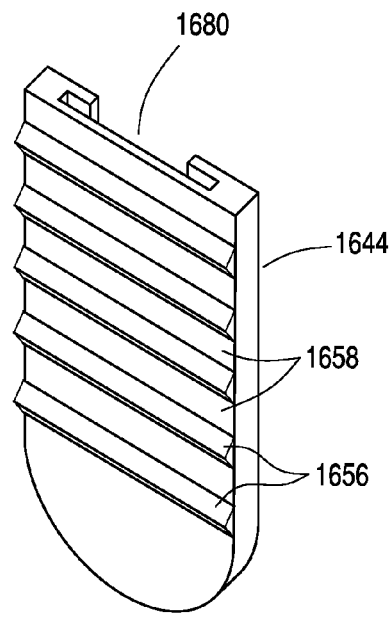
FIG. 33
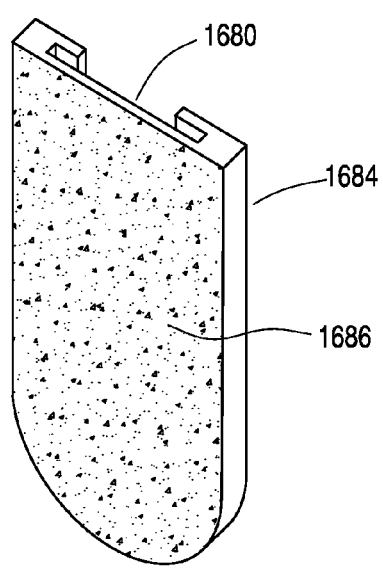
FIG. 34
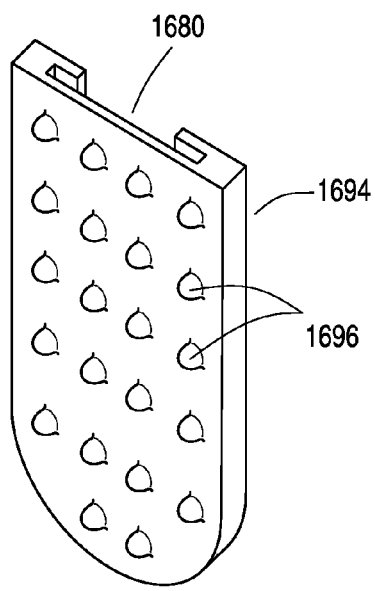
FIG. 35

MOUNTING CLIPS AND ADAPTERS FOR MOUNTING DECORATIVE ARTICLES

CROSS-REFERENCE TO RELATED APPLICATIONS

This application is a national stage application (under 35 USC §371) of PCT/US2014/024081, filed Mar. 12, 2014, which claims benefit of U.S. application No. 61/777,565, filed Mar. 12, 2013.

BACKGROUND

The field of the present invention relates to mounting clips configured to mount onto a rain gutter downspout, household post, deck post, tree, pole, various sizes of lumber, doorway, or other comparable mounting surface.

Homeowners frequently mount various types of items onto the exterior of a building structure, including security lights, decorative lights, flags, and seasonal decorations. Many times, however, these items are not easily mounted onto building exteriors. Security lights, for example, are usually mounted onto exterior corners of buildings, using screws and specially designed mounting brackets. Decorative lights are often mounted with hook-type attachments, which are nailed or screwed into the building exterior or joined to horizontally disposed rain gutters. Flag mounts and other types of seasonal decorations are similarly mounted to building exteriors, using special attachments which are screwed or nailed into place.

Unfortunately, when lights, flags, decorations, and other mountable elements are not in use, the mounting devices used to attach these lights and decorations are left behind, potentially decreasing the aesthetic value of the building. In addition, when these mounting devices and their respective fastening elements are removed, damage made during installation is revealed. Depending on the material of the building structure, after removal of these elements, scratches, holes, cracks, rips, and tears in building exteriors are apparent. Besides negatively affecting the aesthetic appearance of building exteriors, the resulting damage may also provide entry sites for insects, water, wind, and dirt.

Various types of solutions have been proposed to attach lights, flags, decorations and other types of mountable elements to building exteriors. However, few solutions allow for attachment to a building structure without penetrating the structure's exterior. Moreover, few, if any, of these proposed solutions have considered attaching mountable elements, such as lights and decorations to rain gutter downspouts and other comparable vertically disposed mounting surfaces.

Downspouts, which are also commonly known as waterspouts, down pipes, drain spouts, and drain pipes, are vertically positioned conduits which are coupled to horizontally positioned gutters to carry rainwater from a gutter to ground level. Downspouts primarily direct water away from a building's foundation. By using downspouts, water may be directed to a sewer, rain collection area, or to the ground at a distance from a building foundation. Downspouts generally are positioned vertically against exterior building walls, and typically are coupled to building exteriors using straps positioned at various points along the vertical length of the downspout. Although some proposed solutions have considered clip-type attachments for decorative lights to horizontally-positioned gutters disposed along a roofline, these attachments are not adaptable to the shape and configuration of downspouts and other comparable vertically disposed mounting surfaces.

For these reasons, among others, there is a clear need for improved mounting clips used to mount lights, decorations, and other types of mountable elements. More particularly, a need exists for mounting clips that may be installed and removed repeatedly without causing significant harm to the supporting structure. The present invention fulfills these needs and provides further related advantages, as described in the following summary.

SUMMARY

In one aspect of the invention, a mounting clip is configured for attachment to a downspout or other comparable mounting surface. The mounting clip includes a frame having a plurality of extending arms and a central portion disposed between at least two of the plurality of extending arms.

In one mounting clip configuration, a blank receiving area, configured to mate with a blank, is defined in the central portion. Various types of mountable elements may be coupled to the blank, including hooks, clips, arms, and mounting plates. The extending arms, central portions and/or rear portions of the frame may include projections and channels, which are complementary to the mounting surface such that the clip engages with the surface without the need for fastening elements.

Variations include adding adapters or straps to the distal ends of the arms to facilitate mounting the clip to non-standard gutter downspouts or other desired mounting surfaces. The mounting clip may be configured specifically for mounting to a side surface of a downspout. The mounting clip may have movably connected arms so that the gap spacing between the distal ends of such arms may be adjusted to accommodate larger or smaller mounting surfaces. The mounting clip may have straps that attach to the ends of the arms so that the straps may be joined around a mounting surface. Alternatively, the mounting clip may not have arms, but the straps may have proximal ends that fit within a channel in the body of the mounting clip. Engagement mechanisms may be supplied to lock or engage the straps to the mounting clip. Other variations include a frictional surface on the blank or a detent snap fitting for joining the blank to the central portion.

A more complete understanding of the invention, including an understanding of the various configurations of mounting clips and decorative mounting articles, will be afforded to those skilled in the art, as well as a realization of additional advantages and objects thereof, by consideration of the followed detailed description. Reference will be made to the appended drawing sheets which will first be described briefly.

BRIEF DESCRIPTION OF THE DRAWINGS

The drawings described herein are for illustrative purposes only and are not intended to limit the scope of the present disclosure. In the drawings, wherein like reference numerals refer to similar components:

FIG. 3B is a right perspective view of an alternative embodiment of the first configuration of a mounting clip with a blank therein, wherein said blank is coupled to a flag or banner attachment;

FIG. 3C is a right perspective view of another alternative embodiment of the first configuration of a mounting clip with a blank therein, wherein said blank is coupled to a hook attachment;

FIG. 13 is a right front perspective view of a mounting clip with articulating portions at the ends of the arms;

FIG. 14 is a right front perspective view of a mounting clip with a removable strap engaged to the distal ends of upper arms of the mounting clip;

FIG. 15 is a right front perspective view of the mounting clip of FIG. 14 with a second removable strap engaged to the distal end of a lower arm and released from the distal end of a second lower arm of the mounting clip;

FIG. 20 is a right front perspective view of a mounting clip with another embodiment of ratcheting straps for adjusting strap length;

FIG. 21 is a partially exploded right front perspective view of the mounting clip of FIG. 20;

FIG. 24 is a partially exploded right front perspective view of a mounting clip with yet another embodiment of ratcheting straps for adjusting strap length;

FIG. 25 is a cross-sectional view of the mounting clip of FIG. 24 as assembled with ratcheting straps engaged in receiving slots;

FIG. 26 is a cross-sectional view of the mounting clip of FIG. 24 with a proximal end of one ratcheting strap still to be engaged within a receiving slot;

FIG. 27 is a partially exploded right front perspective view of a mounting clip with still yet another embodiment of ratcheting straps for adjusting strap length;

FIG. 28 is a cross sectional view of the mounting clip of FIG. 27 as assembled with ratcheting straps engaged in receiving slots;

FIG. 29 is a cross-sectional view of the mounting clip of FIG. 27 with a proximal end of one ratcheting strap still to be engaged within a receiving slot;

FIG. 32 is a partially exploded right front perspective view of a mounting clip and a blank wherein the blank receiving area of the central portion of the mounting clip defines a series of ridges separated by channels or valleys;

FIG. 33 is a right front perspective view of a blank with ridges extending outwardly from its rear surface;

FIG. 34 is a right front perspective view of a blank with a textured or otherwise high friction rear surface; and FIG. 35 is a right front perspective view of a blank with projections extending outwardly from its rear surface.

DETAILED DESCRIPTION

Turning in detail to the drawings, FIGS. 1-12 show various configurations of mounting clips 10, 100, 200, 300, 400, 500, 600, 700. The mounting clips and decorative mounting articles described herein are configured for mounting onto a downspout or other comparable vertically disposed mounting surface. As used herein, the term "downspout" should be broadly construed as any conduit that may couple to a roof gutter or drainage system on a building structure. Moreover, as used here, the term "building structure" should be construed broadly as any structure having walls suitable for installation of a downspout or comparable vertically disposed mounting surface. Such structures are therefore not limited to stationary building structures, but may also include boats, mobile homes, and recreational vehicles, which may be suitable for habitation.

It is also within the scope of this invention for the mounting clips and decorative mounting articles to be mounted on alternative mounting surfaces other than vertically disposed mounting surfaces. Alternative mounting surfaces may comprise, for example and without limitation, hand railings, deck railings, porch railings, whether horizontally disposed or angularly disposed, trees, poles, various sizes of lumber, and doorways.

The mounting clips and decorative mounting articles shown may be manufactured from a variety of material types. However, in preferred configurations, the clips and articles are manufactured with flexible materials, including, but not limited to, elastomeric, thermoplastic, and metallic materials. A representative metal is aluminum. Representative thermoplastic materials are polyvinylchloride (PVC) and polyurethane. A representative elastomeric material is rubber or latex rubber. Such materials should be substantially weather resistant such that they are not subject to significant corrosion upon frequent exposure to rain, snow, ice, humidity, etc. Alternatively, the materials may be impregnated with or coated with protective materials, such as but not limited to, antimicrobials, UV-resistants and/or flame retardants, which provide sufficient weather resistance.

Mounting clips and decorative mounting articles may also be manufactured with different types of colors such that they blend with the building structure or downspout material. Alternatively, mounting clips and decorative mounting articles may be manufactured having a contrasting color, decoration, or pattern that lends to building aesthetics or seasonal decor. For example, mounting clips may have a shape and color that changes the appearance of a downspout to appear from a distance to be a striped candy cane. In addition, mounting clips and decorative mounting articles may have shapes and colors that are complementary to other décor positioned close to the building structure.

Figure 1:
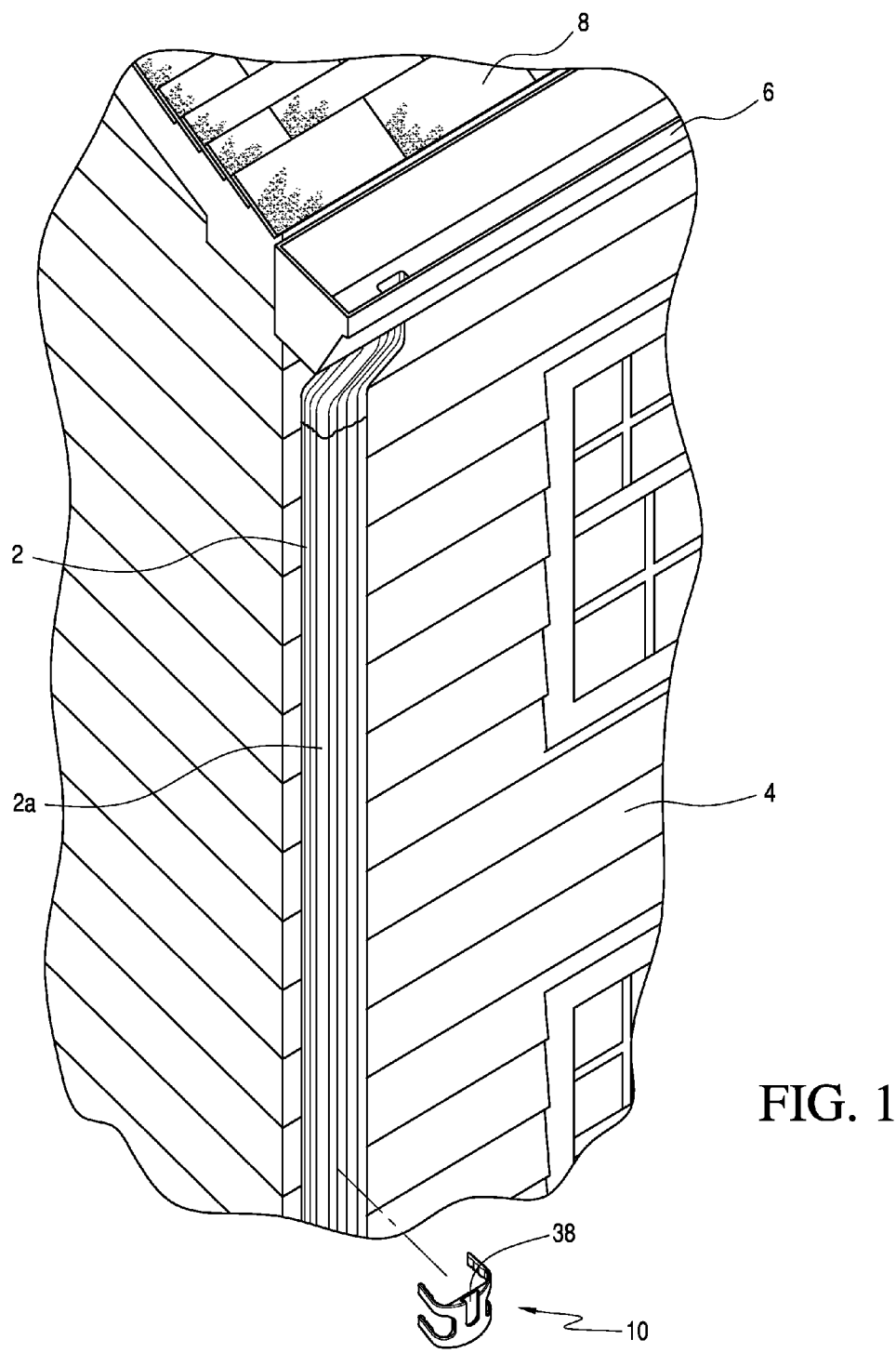
FIG. 1 is a right perspective view of one configuration of a mounting clip positioned for alignment onto a downspout.
Figures 2, 3A:
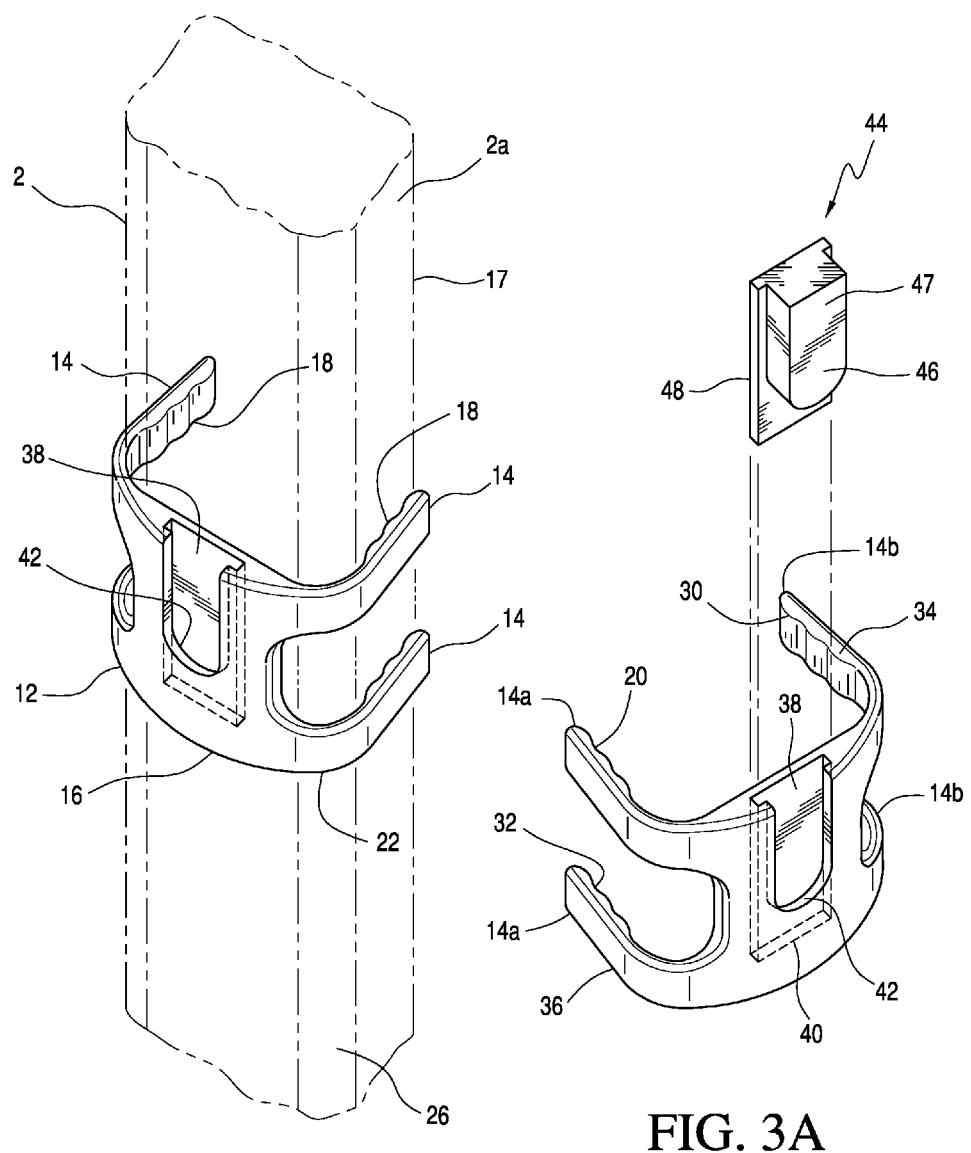
FIG. 2 is a left perspective view of the mounting clip shown in FIG. 1.
FIG. 3A is a right perspective view of the mounting clip shown in FIG. 1 and a blank positioned in alignment with a blank receiving area on the clip.

FIGS. 1-3C and 12 show on version of a mounting clip 10 configured for attachment to a mounting surface 2, such as a downspout 2a, a post 2b (FIG. 12), or other comparable mounting surface. The downspout 2a is in a substantially vertical position against a building structure 4 and may be coupled to a horizontally positioned gutter 6, which is coupled to a roof 8 of the building structure. Referring particularly to FIGS. 2 and 3A, in one configuration, the mounting clip 10 includes a frame 12 having a plurality of extending arms 14 and a central portion 16 disposed between at least two of the plurality of extending arms. The frame 12 has a shape that is complementary to a profiled mounting surface 17, which is represented in hidden lines in FIG. 2. A "profiled mounting surface" is defined herein as a surface that engages with complementary engagement portions of a mounting clip or a decorative mounting article, as further described below.

Where the mounting surface 2 is a downspout that has a generally rectangular cross-section with rounded corners, the frame 12 may be substantially u-shaped such that it covers front sections and side sections of the downspout. If the mounting surface, such as a downspout, has a generally circular cross-section, however, the frame may be substantially c-shaped. Other complementary frame configurations may also be realized, depending upon the cross-sectional shape of the mounting surface.

In the configuration shown in FIGS. 1, 2 and 3A, the mounting clip 10 includes at least two extending arms 14 each having an engagement portion 18 with a profiled inner section 20. The clip 10 also includes a corner section 22 that engages with the corners 26 of the mounting surface 2, while the profiled inner sections 20 is configured to engage with a profiled mounting surface 17. The profiled inner section 20 of the extending arm also may include projections 30 and channels 32 that extend from an upper arm edge 34 to a lower arm edge 36.

Opposing extending arms 14a, 14b may be slightly tapered toward one another such that upon installation onto a mounting surface 2, the arms 14a, 14b are pulled apart. During installation, extending arms 14a, 14b may then be released and positioned such that projections 30 and channels 32 of the profiled inner section 20 are in substantial alignment with the profiled mounting surface 17. Thus, when the mounting clip 10 is installed on a downspout, projections 30 fit within or engage recesses or channels of the profiled mounting surface 17, and ridges or raised portions of the profiled mounting surface 17 fit within or engage with channels 32 such that the clip is held onto the surface without the use of fastening elements, such as tape, nails, and screws, or the like. The engagement of the profiled sections 20 of the clip 10 and the mounting surface 17 is such that the clip 10 may be quickly installed onto the mounting surfaces by pushing force, and then in turn quickly removed by pulling the extending arms away from the mounting surface 17. When the clip 10 is mounted on the mounting surface 17, the extending arms 14a, 14b provide sufficient force to hold the clip in place and to support various types of mountable elements 19, including decorations, flag poles, and lights, as further described below. The engagement of the clip 10 to the mounting surface 17 is a snap fit or comparable to a snap fit, and the clip 10 may be installed and removed repeatedly from the engagement to the mounting surface 17.

In the configuration shown in FIGS. 1-3C, the central portion 16 includes a blank receiving area 38, having a varying wall thickness, with at least one wall thickness portion having a greater wall thickness than the extending arm wall thickness. The blank receiving area 38 defines a slotted are 40, having one section with a substantially rectangular shape, and a blank opening area 42. The shapes of the slotted area and the blank opening area shown in FIGS. 1-3C, however, should not be construed as limited. Each of these areas 40, 42 may have any shape that facilitates mating with a blank 44. Mating may occur by slidable engagement, snap engagement, lock and key type arrangements, male and female arrangements, and/or any other engagement method used alone or in combination that allows for mounting of the blank onto the mounting clip.

In the configuration of FIGS. 1-3C, the blank 44 includes a protruding section 46 and a mating section 48. The mating section 48 is configured for positioning within the slotted area 40 such that the blank 44 slides into the blank receiving area 38. The protruding section 46 includes a face portion 47, which is configured for coupling with various types of mountable elements.

Figure 10:
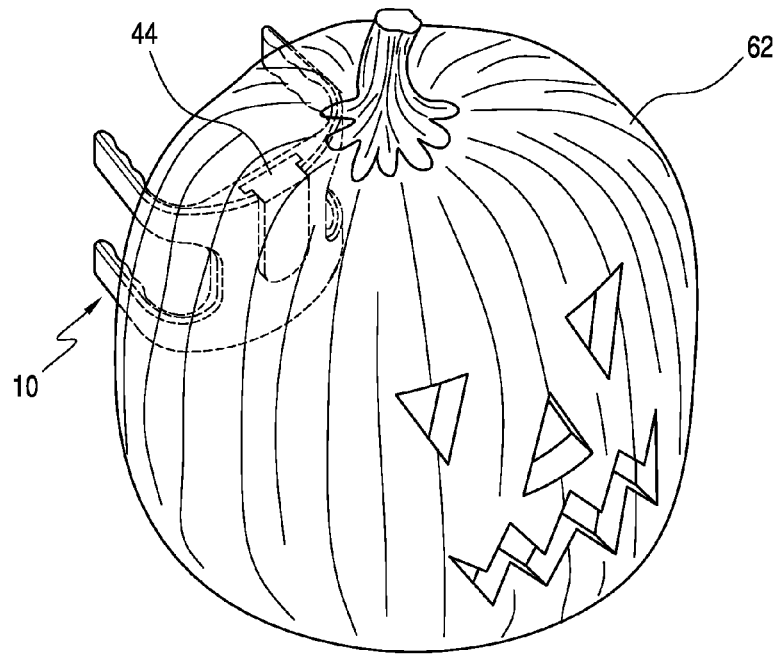
FIG. 10 is a right perspective view of a decorative article coupled to a mounting clip.

Mountable elements include, but are not limited to, arm attachments 50 (FIG. 3B), hook attachments 52a (FIGS. 3C, 12), 52b (FIG. 4B), 52c (FIG. 8), clip attachments 54 (FIGS. 4A, 5 and 6), plate or bracket attachments 56 (FIG. 7), and decorative articles 700 (FIG. 10). These types of mountable elements 19 allow a user to position flags or banners 53 (FIG. 3B), string lights, security lights, birdhouses, decorative lights, decorative articles, electrical outlets, and any other product type suitable for mounting. In alternative configurations, these types of mountable elements may be integral to the central portion, as shown particularly in FIGS. 4A, 6 and 11. Alternatively, hooks, clips, mounting plates, and similar devices may be directly attached to a central portion on one or more clips, using fastening elements such as adhesives, tapes, and screws. See, e.g., FIG. 7. The central portion 16 of the clip 10 is preferably used as an attachment point for one or more mountable elements. As such, a mountable element may be coupled to the central portion using any viable method. Such methods include use of molding techniques, adhesives, fasteners 58 (FIG. 7), and other types of fastening elements.

Figure 4A:
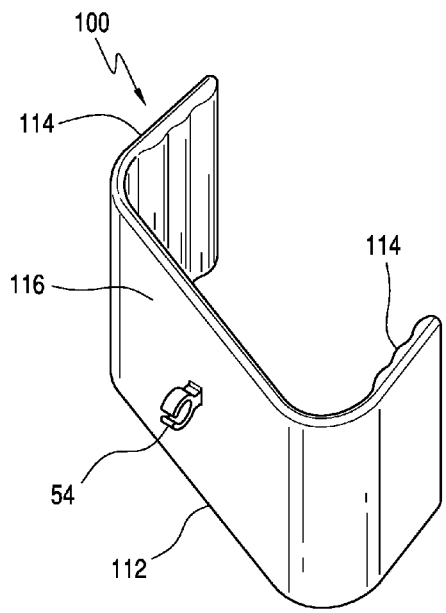
FIG. 4A is a right perspective view of a second configuration of a mounting clip.
Figure 5:
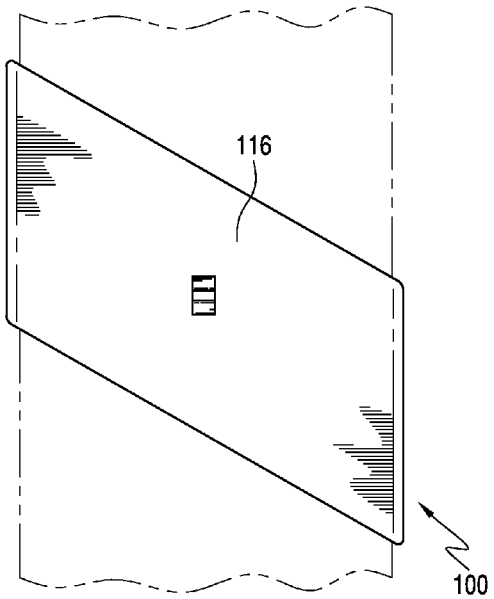
FIG. 5 is a front view of the mounting clip configuration shown in FIG. 4.
Figure 4B:
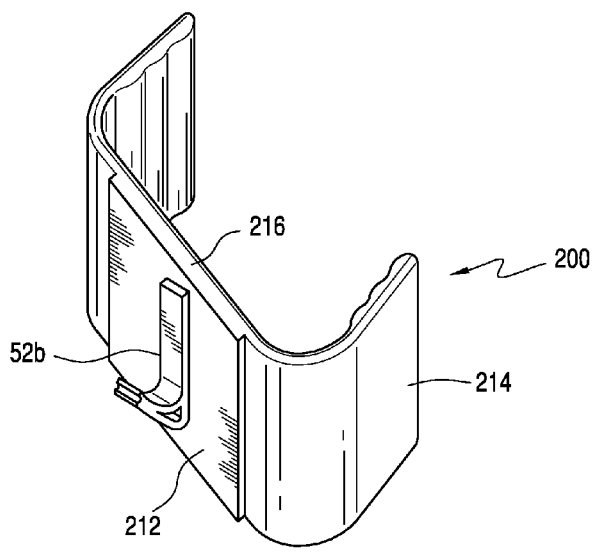
FIG. 4B is a right perspective view of a third configuration of a mounting clip.

FIGS. 4A, 4B and 5 show other configurations of a mounting clip 100, 200 that may attach to a mounting surface 2. Here, each mounting clip includes a frame 112, 212 having two extending arms 114, 214 and an angularly aligned or slanted central portion 116, 216 disposed between the extending arms. When multiple mounting clips of this configuration are coupled to a downspout, the downspout may have a striped appearance when viewed from a distance. For example, where the downspout is white and the clips 100, 200 are red, from a distance, the downspout may look like a candy cane. This type of configuration is therefore particularly suitable for use as a decorative element during the Christmas holidays. FIGS. 4A and 5 show a clip-type attachment 54 which may be used to string lights, garland, ropes, cords, etc. FIG. 4B shows an alligator hook-type attachment 52b, which may also be used to hang lights, garland, ropes, cords, and similar objects.

Figure 6:
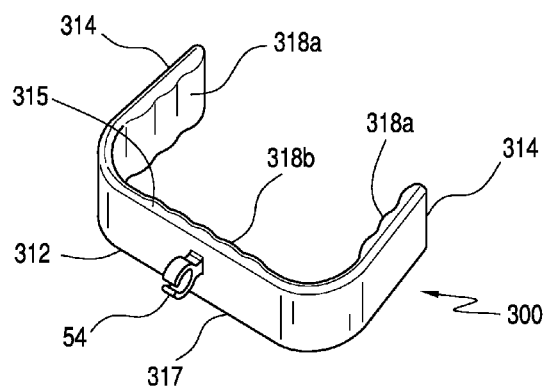
FIG. 6 is a right perspective view of a fourth configuration of a mounting clip.

FIG. 6 shows one configuration of a mounting clip 300 having a horizontally positioned central portion 316 and extending arms 314. Here, the central portion of the clip includes an arm engagement portion 318a and a central engagement portion 318b. The central engagement portion extends from an upper face 315 to the lower face 317 of the central portion 316. These engagement portions 218a, 318b provide additional means of retaining the clip 300 onto a mounting surface.

Figure 7:
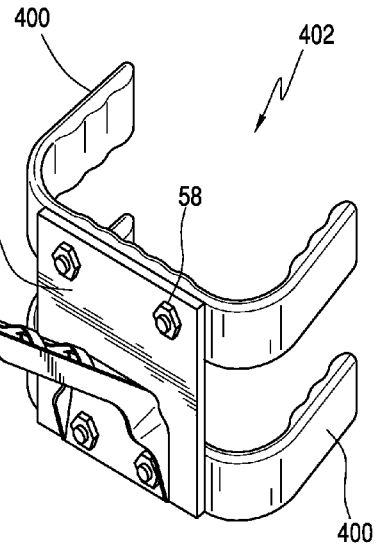
FIG. 7 is a right perspective view of a mounting clip assembly.

FIG. 7 shows an example of one method of coupling mounting clips 400 to form a mounting clip assembly 402, using a plate or bracket 56. This type of attachment may be used to couple other types of mountable elements such as a flag holder 60, security light brackets, etc., which are normally directly mounted onto vertical surfaces of building structures.

Figure 8:
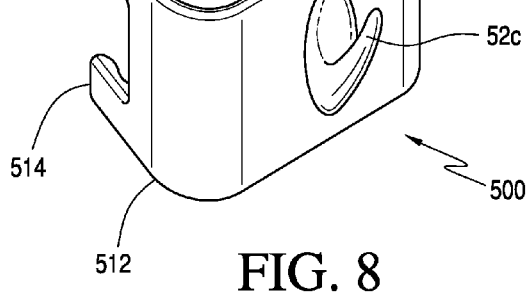
FIG. 8 is a right perspective view of a fifth configuration of a mounting clip.
Figure 9A:
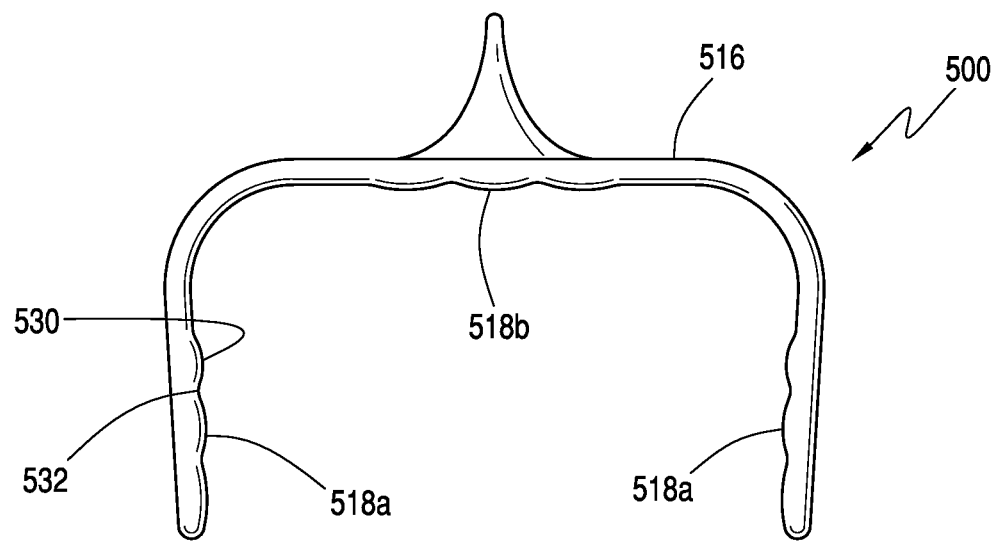
FIG. 9A is a top view of a mounting clip configuration shown in FIG. 8.
Figure 9B:
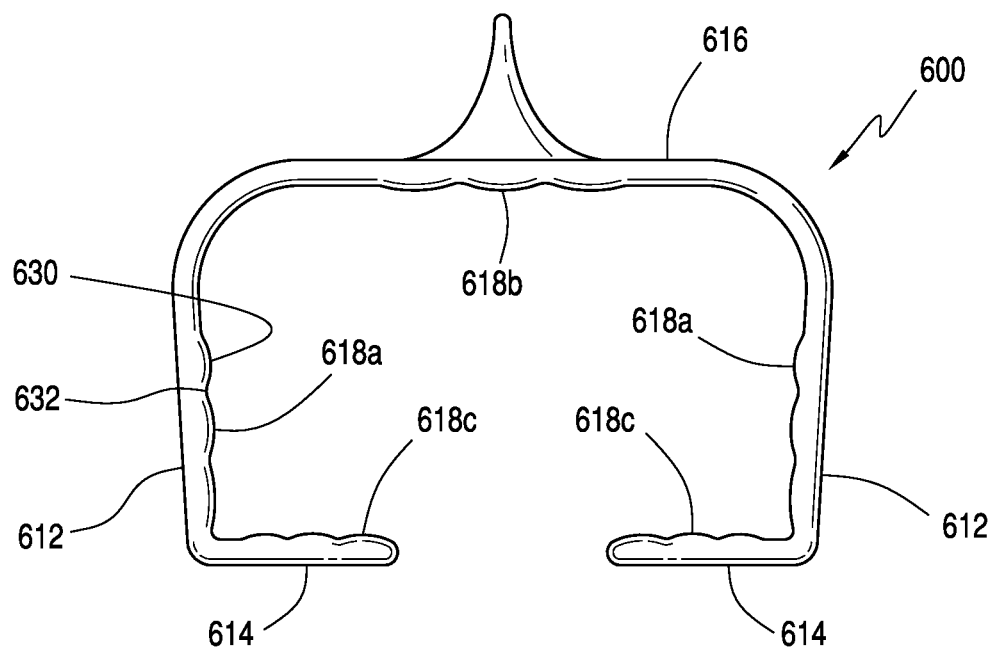
FIG. 9B is a top view of a sixth mounting clip configuration.

FIGS. 8, 9A and 9B show additional configurations of mounting clips 500, 600. Here, each mounting clip includes a frame 512, 612 having four extending arms 514, 614 and horizontally positioned central portion 516, 616 disposed between the extending arms with engagement portions 518a, 618a. FIGS. 8 and 9A show engagement portions 518a, 518b disposed on profiled inner sections on the extending arm and the central portion. In FIG. 9B, each extending arm 614 is configured to extend around a rear portion of a mounting surface (not shown). As such, this version of the mounting clip 600 includes rear engagement portions 618c. Each engagement portion has projections 530, 630, respectively, separated by channels 532, 632, which facilitate attachment of the mounting clip 500, 600 to a mounting surface.

FIG. 10 shows another configuration of a decorative article 62 suitable for attachment to a mounting clip 10. In FIG. 10, the rear of the decorative article is coupled to a blank 44. Alternatively, a blank may be formed integrally to extend from a surface of a decorative article. Although a pumpkin is shown as the decorative article in this example, any type of decorative article or element may be coupled to the blank 44 or may have a blank integrally formed therein. Other nonlimiting examples of decorative articles include mountable stars, hearts, icicles, snow men, candy canes, reindeer, Santa Clauses, angels, stuffed animals, etc.

Figure 11:
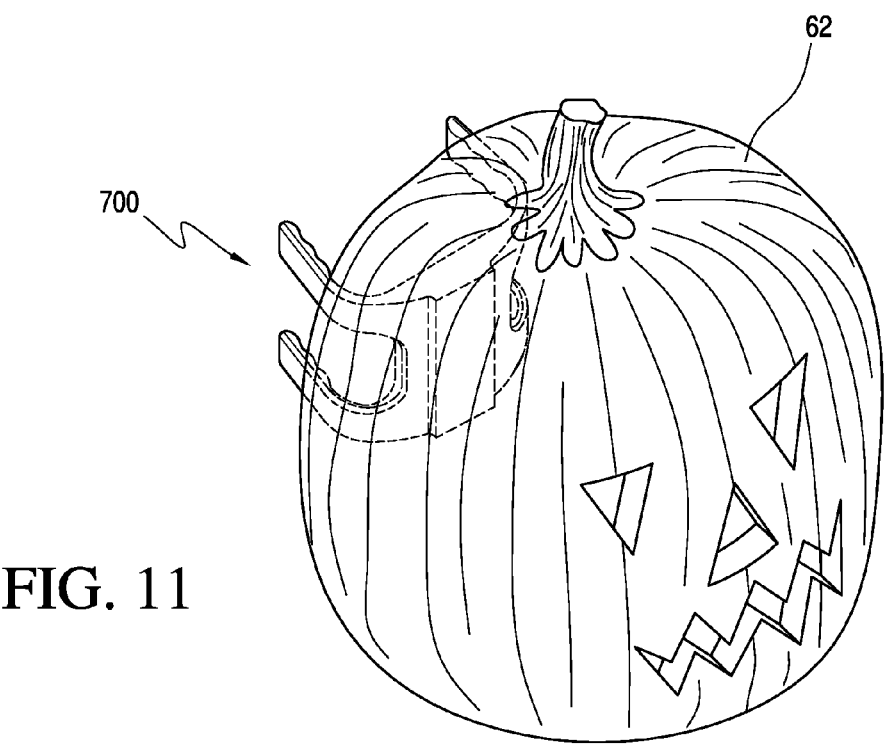
FIG. 11 is a right perspective view of a decorative article having an integrated mounting clip.
Figure 12:
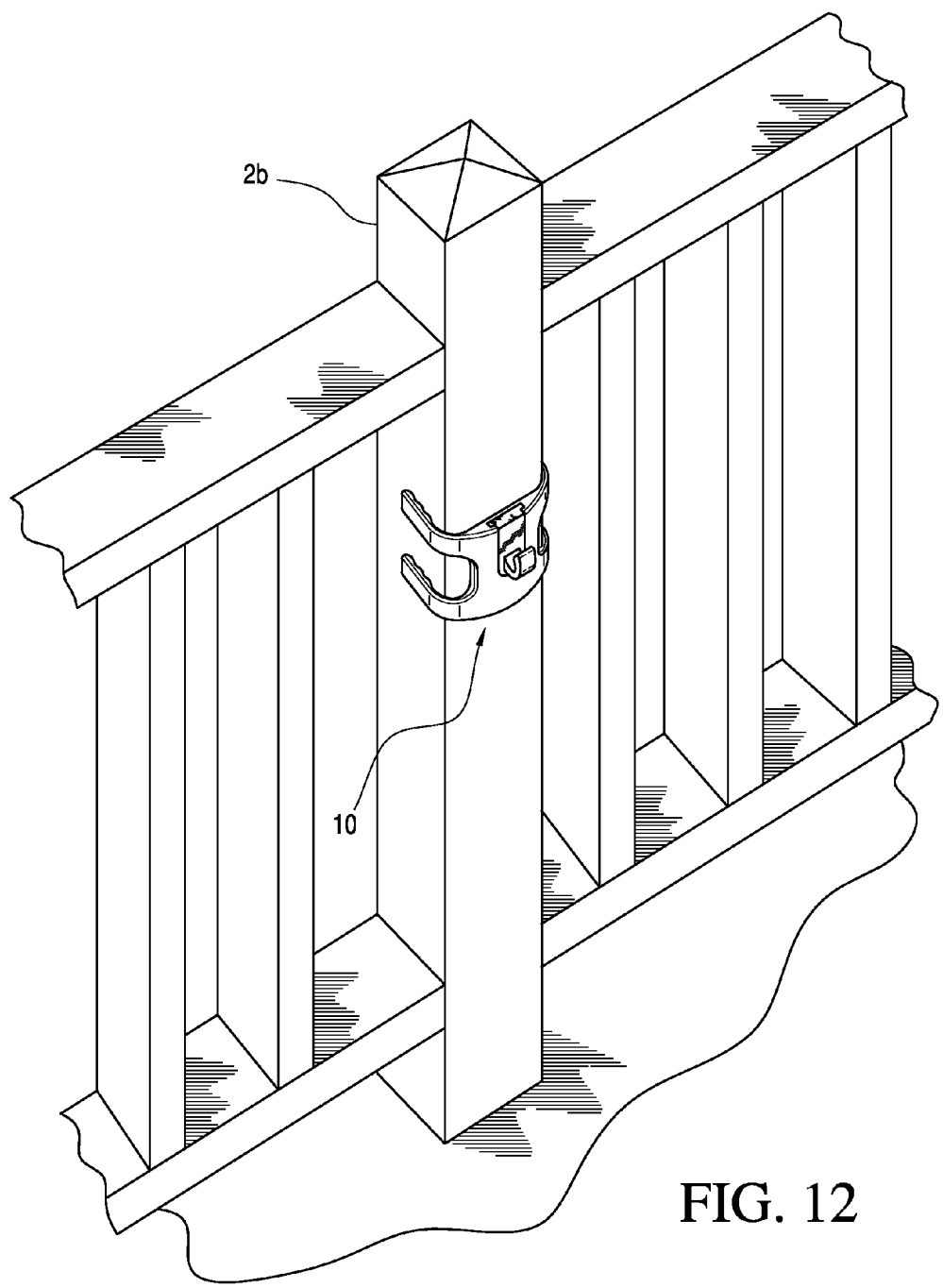
FIG. 12 is a perspective view of one mounting clip configuration mounted onto a vertical post.

FIG. 11 shows a mounting article 700 integrally formed with the decorative article 62, using any viable technique. Such techniques include, but are not limited to, molding and machining.

The mounting clips shown include engagement portions having shapes, which may be complementary to various types of profiled mounting surfaces. In preferred configurations, extending arms, central portions, and/or rear portions each include respective engagement portions having projections and channels. These respective engagement portions are configured to engage with profiled mounting surfaces such that mounting clips and decorative elements may be coupled to the mounting surfaces without use of other fastening elements.

Referring next to FIG. 13, a mounting clip 800 has a frame 812 with a central portion 816 and arms 814 extending away from the central portion. The central portion 816 of the mounting clip 800 has a slotted area 840 that forms a blank receiving area 838. Adapters 870 are attached to the distal ends 876 of the arms 814. Adapters 870 are formed of a resilient material, such as but not limited to, polyurethane foam, melamine foam, rubber, latex rubber. The adapters 870 modify the thickness of the arms 814, and offer a better frictional engagement to a mounting surface when the mounting clip 800 is installed onto the mounting surface.

FIGS. 14 and 15 show a mounting clip 900 that has a frame 912 with a central portion 916 and arms 914 extending away from the central portion. The central portion 916 of the mounting clip 900 has a slotted area 940 that forms a blank receiving area 938. The arms 914 define projections 930 and grooves or channels 932. The projections 930 and channels 932 are adapted to engage with complementary grooves and ridges of a mounting structure, such as a rain gutter downspout. In some embodiments, the decorative articles to be appended to the mounting clip 900 are heavy. In some other embodiments, the mounting surface may not have complementary grooves and ridges to engage with the projections 930 and channels 932 of the arms 914 of the mounting clip.

To permit the mounting clip 900 to be attached to mounting surfaces that do not have complementary grooves and ridges, or to mounting surfaces that are of a different size, or to support the attachment when the mounting clip is used in association with a heavy decorative article, the mounting clip 900 may be provided with additional reinforcing straps. As shown in FIGS. 14 and 15, receiving pins 972 project outwardly from the side faces of the arms 914. Straps 970a, 970b have a proximal end and a distal end, with holes 974 defined at or near each proximal end and distal end. Each hole 974 engages a respective pin 972 to join the straps 970a, 970b to the arms 814 of the mounting clip 900. The straps 970a, 970b may be used singly or together in association with a mounting clip 900. In the configuration shown in FIG. 15, the straps 970a, 970b are engaged to the top arms or the bottom arms, respectively. The straps 970a, 970b are engaged at one end to the arms of one side of the mounting clip 900, and wrapped around a mounting surface, and then joined at their opposite end to the arms of the opposite side of the mounting clip.

Figure 16:
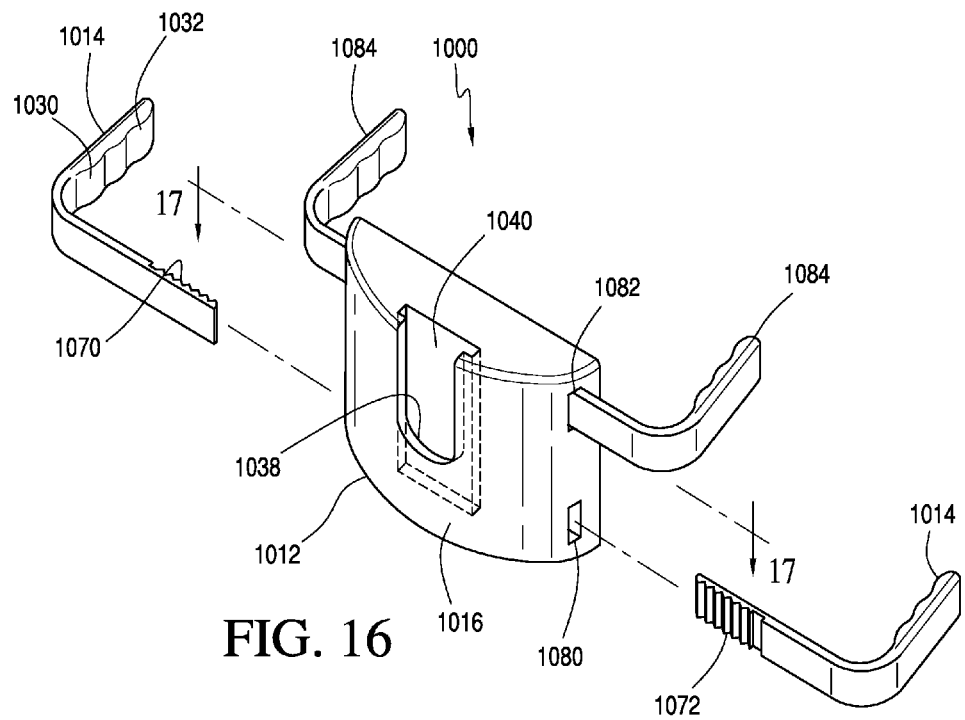
FIG. 16 is a partially exploded right front perspective view of a mounting clip with ratcheting arms for adjusting arm spacing.
Figure 17:
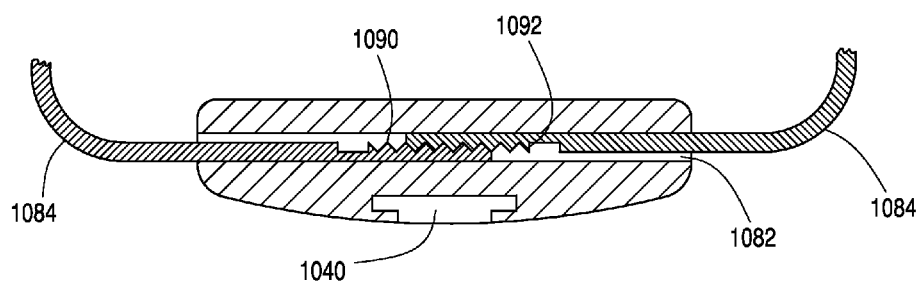
FIG. 17 is a cross-sectional view taken along line 17-17 of FIG. 16.

FIGS. 16 and 17 show a mounting clip 1000 with adjusting arms 1014, 1084. The mounting clip has a frame 1012 with a central portion 1016. The central portion 1016 defines a slotted area 1040 that forms a blank receiving area 1038. Channels 1080, 1082 are formed through the central portion 1016. A first set of arms 1014, have proximal ends each with a series of ridges or grooves 1070, 1072 on one side. The series of ridges or grooves 1070 faces the same direction as the distal end of the arm 1014. The series of ridges or grooves 1072 faces the opposite direction from the distal end of the arm 1014. The proximal ends of the arms 1014 are slidably inserted into the channel 1080 in such a manner that at least a portion of the series of ridges or grooves 1070, mates with at least a portion of the series of ridges or grooves 1072. Similarly, arms 1084 each have proximal ends that each have a series of ridges or grooves 1090, 1092. As shown in FIG. 17, at least a portion of the series of ridges or grooves 1090 mates with at least a portion of the series of ridges or grooves 1092. By adjusting the number of ridges or grooves in engagement, the extent that the distal ends of the arms 1014, 1084 are separated from one another may be adjusted.

Figure 18:
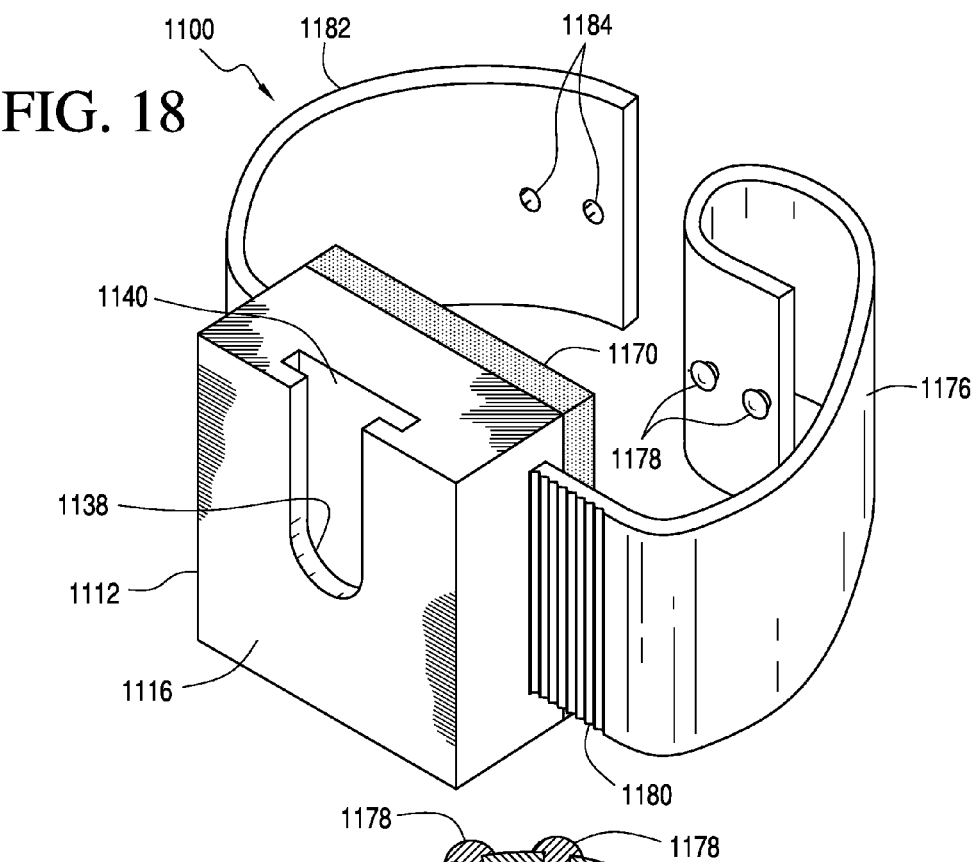
FIG. 18 is a right front perspective view of a mounting clip with ratcheting straps for adjusting strap length.
Figure 19:
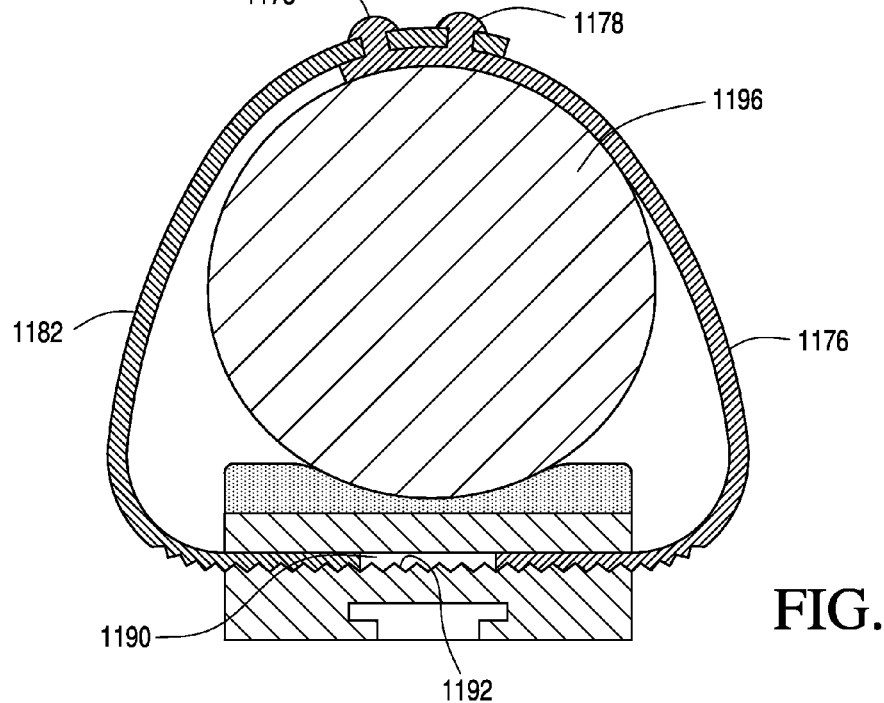
FIG. 19 is a cross-sectional view of the mounting clip of FIG. 18 showing the mounting clip with its ratcheting straps engaged at their distal ends to surround a mounting post.

FIGS. 18 and 19 show another mounting clip 1100 that lacks arms, and instead uses only straps to engage the mounting clip to a mounting surface (1196). In this embodiment, the mounting clip has a frame 1112 with a central portion 1116. The central portion 1116 defines a slotted area 1140 that forms a blank receiving area 1138. The central portion 1116 also includes a channel 1190 therethrough. The central channel 1190 has a series of ridges or grooves 1192 formed on an inner surface thereof.

A first strap 1176 has a distal end and one or more pins 1178 projecting from a surface of the first arm at or near the distal end. The first strap 1176 has a proximal end, and a series of grooves or ridges 1180 are formed at or near the proximal end. The proximal end is adapted for slidable insertion into the channel 1190. When the proximal end is so inserted into the channel 1190, at least some of the grooves or ridges 1180 engage or mate with at least some of the ridges or grooves 1192 defined in the channel.

A second strap 1182 has a distal end and one or more holes 1184 therethrough at or near the distal end. The second strap 1182 has a proximal end, and a series of grooves or ridges are formed at or near the proximal end. The proximal end is adapted for slidable insertion into the channel 1190. When the proximal end is so inserted into the channel 1190, at least some of the grooves or ridges of the second arm 1182 engage or mat with at least some of the ridges or grooves 1192 defined in the channel.

Once the first and second straps 1176, 1182 are engaged to the central portion 1116, the distal ends of the first and second straps 1176, 1182 may be wrapped around a mounting structure 1196 and joined together by linking the pins 1178 into the holes 1184. See FIG. 19.

A damping pad 1170 or cushion is appended or joined to a rear surface of the central portion 1116. The damping pad 1170 improves frictional engagement of the mounting clip to the mounting structure 1196.

Preferably, the straps 1276, 1282 are formed of a resilient material, such as rubber or spandex, or are formed of leather or plastic.

FIGS. 20 and 21 show another variation of a mounting clip 1200 that includes length adjustable straps 1276, 1282. The mounting clip 1200 has a frame 1212 with a central portion 1216. The central portion 1216 defines a slotted area 1240 that forms a blank receiving area 1238. The central portion 1216 also includes a channel 1290 therethrough. A damping pad 1270 is joined or appended to a rear surface of the central portion.

A first strap 1276 has a distal end and one or more pins 1278 projecting from a surface of the first arm at or near the distal end. The first strap 1276 has a proximal end, and two series of grooves or ridges 1280 are formed at or near the proximal end. A slot 1288 also is formed through the thickness of the first strap at or near the proximal end. The proximal end is adapted for slidable insertion into the channel 1290. When the proximal end of the first strap 1276 is inserted into the channel 1290, at least some of the grooves or ridges 1280 of the first strap engage or mate with at least some of the ridges or grooves defined in the channel.

The second strap 1282 has a distal end and one or more holes 1284 therethrough at or near the distal end. The second strap 1282 has a proximal end, and two series of grooves or ridges are formed at or near the proximal end. In addition, a slot is formed through the thickness of the second arm at or near the proximal end. The proximal end is adapted for slidable insertion into the channel 1290. When the proximal end of the second strap 1282 is inserted into the channel 1290, at least some of the grooves or ridges of the second strap 1282 engage or mate with at least some of the ridges or grooves defined in the channel.

Retracting pins 1230, 1238 are positioned in association with the central portion 1216 so that the pin ends engage into the respective slots 1288 in the proximal ends of the first and second straps 1276, 1282 when the proximal ends of the first and second straps 1276, 1282 are inserted in the channel 1290. The engagement mechanism joining the proximal ends of the straps 1276, 1282 to the central portion 1216 thus includes both the complementary ridges and grooves 1280 that engage complementary grooves and ridges in the channel and the retracting pins 1230, 1238 that engage the slots 1288.

Figure 22:
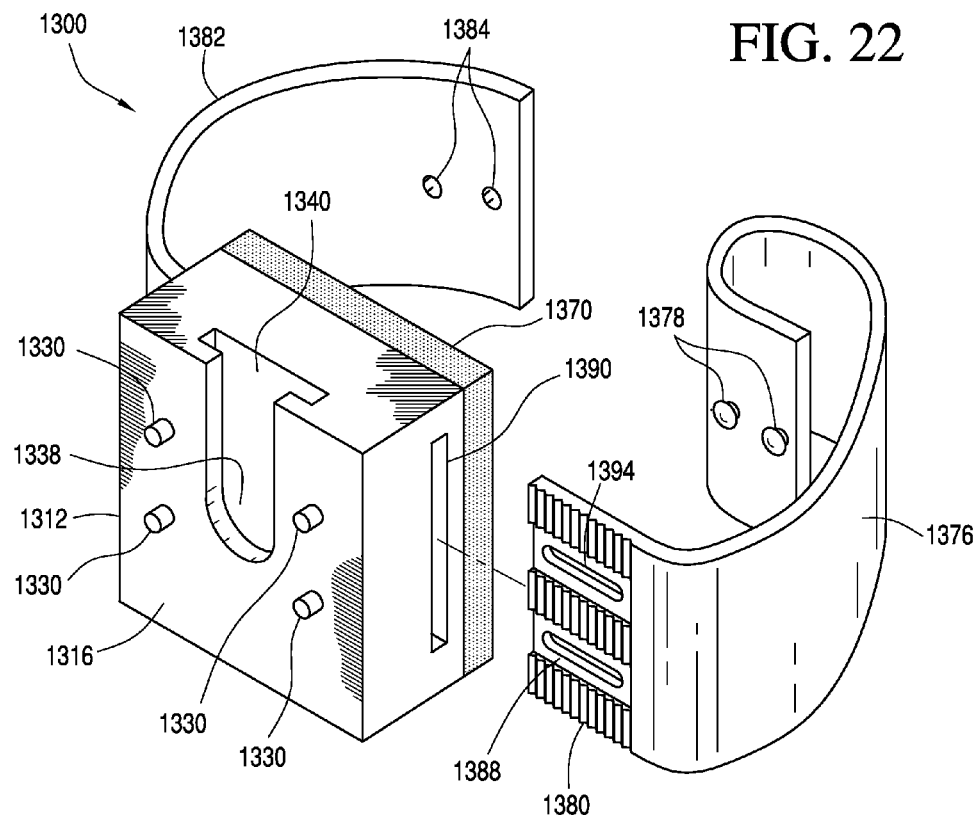
FIG. 22 is a right front perspective view of a mounting clip with still another embodiment of ratcheting straps for adjusting strap length.
Figure 23:
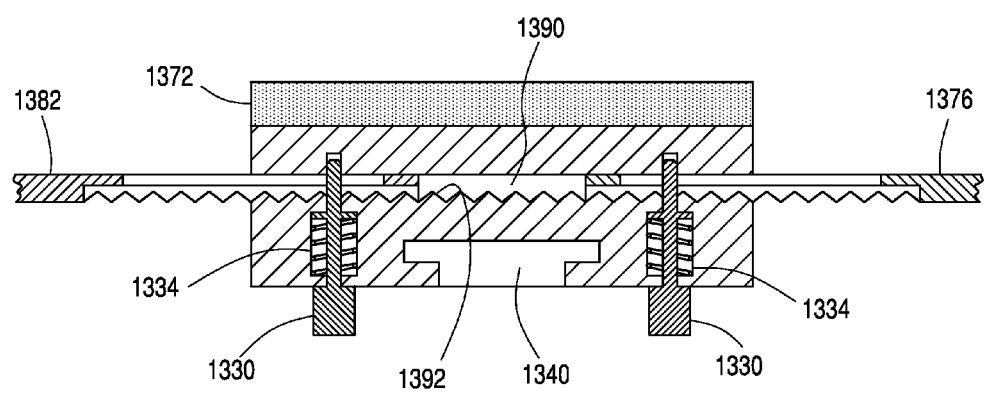
FIG. 23 is a cross-sectional view taken along line 23-23 of FIG. 20.

FIGS. 22 and 23 show yet another variation of the mounting clip shown in FIGS. 20 and 21. In FIGS. 22 and 23, the mounting clip 1300 has a frame 1312 with a central portion 1316. The central portion 1316 defines a slotted area 1340 that forms a blank receiving area 1338. The central portion 1316 also includes a channel 1390 therethrough. A damping pad 1370 is joined or attached to a rear surface of the mounting clip.

A first strap 1376 has a distal end and one or more pins 1378 projecting from a surface of the first arm at or near the distal end. The first strap 1376 has a proximal end, and three series of grooves or ridges 1380 are formed at or near the proximal end. A first slot 1388 and a second slot 1394 also are formed through the thickness of the first strap at or near the proximal end. The proximal end is adapted for slidable insertion into the channel 1390. When the proximal end of the first strap 1376 is inserted into the channel 1390, at least some of the grooves or ridges 1380 of the first strap engage or mate with at least some of the ridges or grooves 1392 defined in the channel 1390.

The second strap 1382 has a distal end and one or more holes 1384 therethrough at or near the distal end. The second strap 1382 has a proximal end, and three series of grooves or ridges are formed at or near the proximal end. In addition, two slots are formed through the thickness of the second arm at or near the proximal end. The proximal end is adapted for slidable insertion into the channel 1390. When the proximal end of the second strap 1382 is inserted into the channel 1390, at least some of the grooves or ridges of the second strap 1382 engage or mate with at least some of the ridges or grooves 1392 defined in the channel 1390.

Retracting pins 1330 are positioned in association with the central portion 1316 so that the pin ends engage into the respective slots 1388, 1394, in the proximal ends of the first and second straps 1376, 1382 when the proximal ends of the first and second straps 1376, 1382 are inserted in the channel 1390. The retracting pins 1330 have springs 1334 to urge the tips of the retracting pins into position within the slots 1388, 1394. The engagement mechanism joining the proximal ends of the straps 1376, 1382 to the central portion 1316 thus includes both the complementary ridges and grooves 1380 that engage complementary grooves and ridges in the channel and the retracting pins 1330 that engage the slots 1388, 1394.

FIGS. 24 to 26 show still another embodiment of a mounting clip 1400 using straps rather than mounting arms. The mounting clip 1400 has a frame 1412 with a central portion 1416. The central portion 1416 defines a slotted area 1440 that forms a blank receiving area 1438. The central portion 1416 also includes a channel 1490 therethrough.

A first strap 1476 has a proximal end and a distal end. Pins or projections 1478 extend from a surface at or near the distal end. Holes 1479 are formed through the first strap 1476 at or near the proximal end.

A strap connector 1481 has a series of pins 1488 projecting from a distal end, and a series of grooves or ridges 1480 formed on a surface at or near its proximal end. The pins 1488 engage with holes 1479 to join the proximal end of the first strap 1476 to the strap connector 1481. The proximal end of the strap connector 1481 is slidably insertable into the channel 1490 so that at least some of the series of grooves or ridges 1480 are held in the channel 1490.

A second strap 1482 has a distal end with one or more holes 1484 formed therethrough. The second strap 1482 has a proximal end with holes formed therethrough. The holes at or near the proximal end engage with a strap attachment for the second strap. The holes 1484 at or near the distal end mate or engage with the pins 1478 of the first strap 1476 when the mounting clip is installed onto a mounting surface.

The first and second straps 1476, 1482 may be of the same or different lengths. Preferably, the straps 1476, 1482 and the strap connectors 1481 are formed of a resilient material, such as rubber or spandex, or are formed of leather or plastic.

Engagement mechanism 1495 are provided in the central portion 1416 to hold the strap connector 1481 in position within the channel 1490. In the embodiment of FIGS. 24-26, the engagement mechanisms include a rotatable blade 1496 that engages at least one of the grooves or ridges 1480 of a respective strap connector 1481.

FIGS. 27 to 29 show still another embodiment of a mounting clip 1500. The mounting clip 1500 has a frame 1512 with a central portion 1516. The central portion 1516 defines a slotted area 1540 that forms a blank receiving area 1538. The central portion 1516 also includes a channel 1590 therethrough. In this embodiment, the channel 1590 is I-shaped.

A first strap 1576 has a proximal end and a distal end. Pins or projections 1578 extend from a surface at or near the distal end. Holes 1579 are formed through the first strap 1576 at or near the proximal end.

A strap connector 1581 has a series of pins 1588 projecting from a distal end, and a series of grooves or ridges 1580 formed on a surface at or near its proximal end. The pins 1588 engage with holes 1579 to join the proximal end of the first strap 1576 to the strap connector 1581. Outwardly directed flanges 1583 are formed at the upper part and lower part of the strap connector 1581. The proximal end of the strap connector 1581 is slidably insertable into the channel 1590 so that at least some of the series of grooves or ridges 1580 are held in the channel 1590.

A second strap 1582 has a distal end with one or more holes 1584 formed therethrough. The second strap 1582 has a proximal end with holes formed therethrough. The holes at or near the proximal end engage with a strap attachment for the second strap. The holes 1584 at or near the distal end mate or engage with the pins 1578 of the first strap 1576 when the mounting clip is installed onto a mounting surface.

The first and second straps 1576, 1582 may be of the same or different lengths. Preferably, the straps 1576, 1582 and the strap connectors 1581 are formed of a resilient material, such as rubber or spandex, or are formed of leather or plastic.

Engagement mechanism 1595 are provided in the central portion 1516 to hold the strap connector 1581 in position within the channel 1590. In the embodiment of FIGS. 27-29, the engagement mechanisms include a retractable pin 1596 that engages at least one of the grooves or ridges 1580 of a respective strap connector 1581.

FIGS. 32-35 show a mounting clip 1600 with means to enhance engagement of a blank 1644 within a slot area 1640 and a blank receiving area 1638. The mounting clip 1600 has a frame with a central portion 1616 that defines a slot area 1640 and a blank receiving area 1638. Arms 1614 extend outwardly away from the central portion 1616. The slot area 1640 has an inner surface on which a series of ridges 1650 separated by channels or grooves 1660 is formed.

A blank 1644 is slidably engagable within the blank receiving area 1638. The blank 1644 may have a slotted area 1680 adapted to receive a mating piece for a decorative article (not shown). One optional blank structure as shown in FIG. 33 has a rear surface on which a series of ridges 1656 separated by channels or grooves 1658 is formed. When the blank 1644 is slidably engaged into the blank receiving area 1638, at least some of the ridges 1656 of the blank are held between the ridges of the slot area 1640 to more securely hold the blank in engagement with the central portion 1616 of the mounting clip 1600.

A second optional blank structure 1684 as shown in FIG. 34 has a rear surface that is textured or coated with a friction enhancing material 1686, such as a rubber, rubber cement or nonpermanent adhesive.

A third optional blank structure 1694 as shown in FIG. 35 has a rear surface from which a series of projections 1696 outwardly extend. When the blank 1694 is slidably engaged into the blank receiving area 1638, at least some of the projections 1696 of the blank are held between the ridges of the slot area 1640 to more securely hold the blank 1694 in engagement with the central portion 1616 of the mounting clip 1600.

Figures 30, 31:
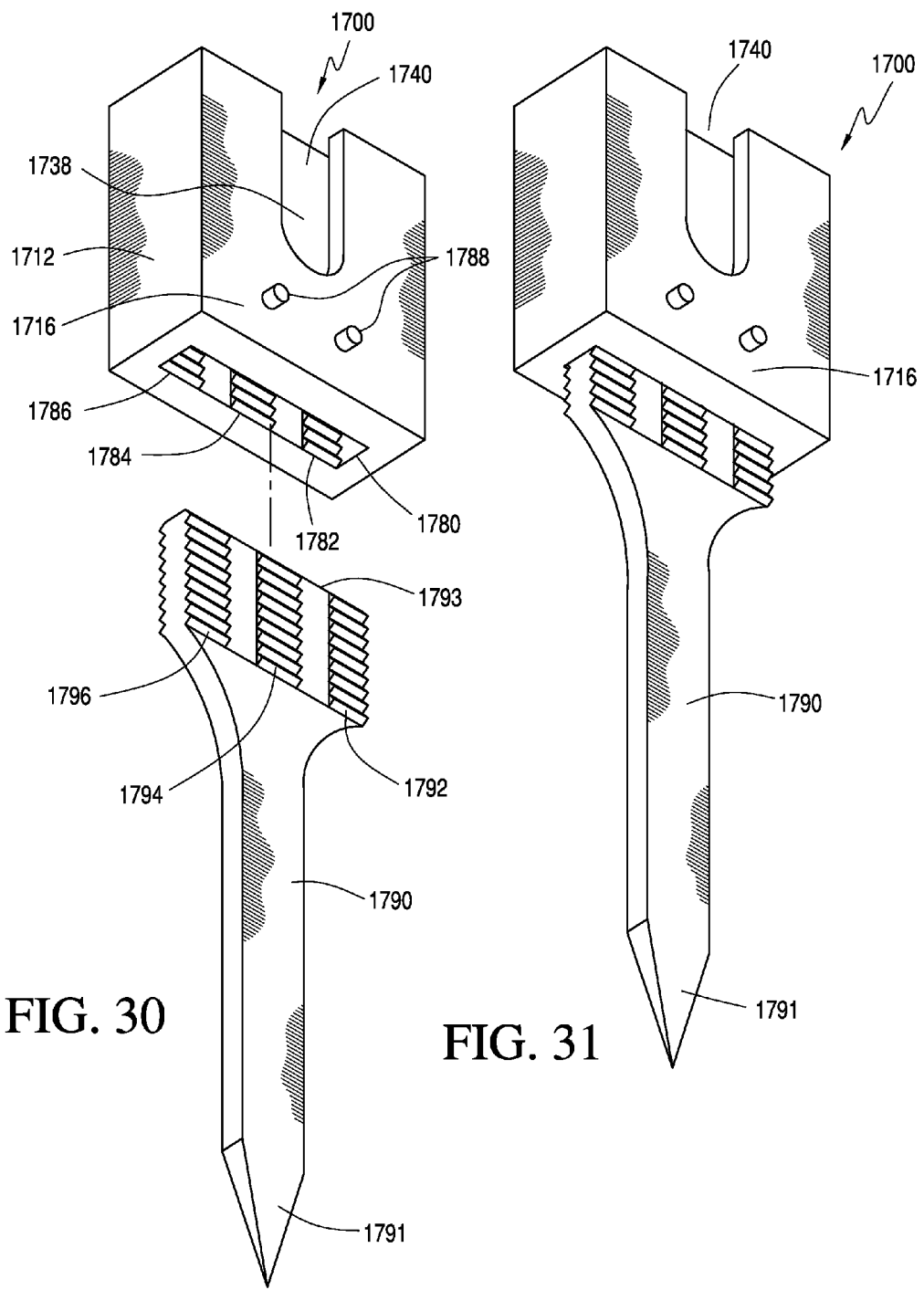
FIG. 30 is a partially exploded right front perspective view of a mounting clip adapted for engagement to a mounting stake.
FIG. 31 is a right front perspective view of the mounting clip and mounting stake of FIG. 30.

FIGS. 30 and 31 show a mounting 1700 for a decorative article associated with a stake. The mounting has a frame 1712 with a central portion 1716. The central portions defines a slot area 1740 and a blank receiving area 1738. The central portion 1716 further defines a slot 1780 or channel opening to the bottom. The inner wall of the slot 1780 has at least one, but optionally more than one series of grooves and ridges 1782, 1784, 1786.

Retracting pins 1788 are provided.

A stake 1790 includes a distal end 1791 with a ground or other mounting surface piercing point. The proximal end 1793 of the stake has a shape complementary to the slot 1780 of the central portion 1716 of the mounting 1700. At least one, but optionally more than one series of grooves and ridges 1792, 1794, 1796 are formed at or near the proximal end 1793. As shown in FIGS. 30 and 31, three series of grooves and ridges are formed on one face surface, and three series of grooves and ridges are formed on the opposite face surface of the stake.

The proximal end 1793 of the stake 1790 is slidably inserted into the slot 1780, and at least some of the series of grooves and ridges of the proximal end of the stake engage or mate with at least some of the series of grooves and ridges of the slot 1780. While the proximal end 1793 is inserted into the slot, retracting pins 1788 are pulled outwardly to retract the ends of the pins from the slot 1780. Once the proximal end 1793 is engaged into the slot 1790, the retracting pins 1788 are released, and the tips of such pins seat or contact within grooves of the stake.

Thus, various configurations of mounting clips and decorative mounting articles are disclosed. While embodiments of this invention have been shown and described, it will be apparent to those skilled in the art that many more modifications are possible without departing from the inventive concepts herein. The invention, therefore, is not to be restricted except in the spirit of the following claims.

GLOSSARY 2 mounting surface
2a downspout
2b post
4 building structure
8 roof 10 mounting clip
12 frame
14, 14a, 14b extending arms
16 central portion
17 profiled mounting surface
18 engagement portion
19 mountable element
20 inner surface or section
22 corner section
26 corner of mounting surface
30 projections
32 channels
34 upper arm edge
36 lower arm edge
38 blank receiving area
40 slotted area
42 blank opening area
44 blank
46 protruding section
47 face portion
48 mating section
50 arm attachments
52a, 52b, 52c hook attachments
54 clip attachment
56 plate or bracket attachment
58 fastener
62 decorative article
100 mounting clip
112 frame
114 extending arm
116 central portion
200 mounting clip
212 frame
214 extending arm
216 central portion
300 mounting clip
314 extending arm
316 central portion
317 lower face
318a, 318b engagement portions
400 mounting clip
402 mounting clip assembly
500 mounting clip
512 frame
514 extending arm
516 central portion
518a, 518b engagement portions
530 projections
532 channels
600 mounting clip
612 frame
614 extending arm
616 central portion
618a, 618b engagement portions
630 projections
632 channels
700 mounting article
800 mounting clip
812 frame portion of mounting clip
814 extending arms
816 central portion
830 projections
838 blank receiving area
840 slotted area
870 arm adapter
872 arm adapter
874 arm adapter
876 arm adapter
900 mounting clip
912 frame portion
914 extending arms
930 projections
932 channels
938 blank receiving area
940 slotted area
970a, 970b straps
972 pin or projection
974 hole
1000 mounting clip
1012 frame portion
1014 extending arms
1016 central portion
1030 projections
1032 channels
1038 blank receiving area
1040 slotted area
1070 ridges and grooves
1072 ridges and grooves
1080 channel
1082 channel
1084 extending arms
1090 ridges and grooves
1092 ridges and grooves
1100 mounting clip
1112 frame portion
1116 central portion
1138 blank receiving area
1140 slotted area
1170 resilient pad
1176 strap
1178 pins
1180 ridges and grooves
1182 strap
1184 holes
1190 channel
1192 ridges and grooves in channel
1196 post
1200 mounting clip
1212 frame portion
1216 central portion
1230 retractable pins
1238 blank receiving area
1240 slotted area
1270 damping pad
1276 strap
1278 pins
1280 ridges and grooves
1282 strap
1284 holes
1288 slot
1290 channel
1300 mounting clip
1312 frame portion
1316 central portion
1330 retractable pins
1334 springs
1338 blank receiving area
1340 slotted area
1370 damping pad
1376 strap
1378 pins
1380 ridges and grooves
1388 slot
1390 channel 1392 ridges and grooves
1394 slot
1400 mounting clip
1412 frame portion
1416 central portion
1438 blank receiving area
1440 slotted area
1476 strap
1478 pins
1479 holes
1480 ridges and grooves
1481 strap connector
1482 strap
1484 holes
1488 pins
1490 channel
1495 lock mechanism
1496 rotatable lock pin
1500 mounting clip
1512 frame
1516 central portion
1538 blank receiving area
1540 slotted area
1576 strap
1578 pins
1579 holes
1580 ridges and grooves
1581 strap connector
1582 strap
1583 shoulder ridge
1584 holes
1588 pins
1590 channel
1591 wider portion of channel
1595 locking mechanism
1596 retracting pin
1600 mounting clip
1614 arms
1616 central portion
1638 blank receiving area
1640 slotted area
1644 blank
1650 ridges
1652 channels
1656 ridges
1658 channels
1660 grooves
1680 slotted area
1684 alternate blank
1686 frictional surface
1694 alternate blank
1696 projections
1700 mounting for decorative article
1716 central portion
1738 blank receiving area
1740 slotted area
1780 channel
1782 ridges and grooves
1784 ridges and grooves
1786 ridges and grooves
1788 retracting pins
1790 stake
1791 stake distal end
1792 ridges and grooves
1793 stake proximal end
1794 ridges and grooves
1796 ridges and grooves

What is claimed is:

1. A mounting for a decorative article, comprising:
a body (1712) having a front wall and a rear wall and defining in the front wall a slot (1738) adapted to receive a slidably engagable blank onto which the decorative article is joined or integrally formed, said body further defining an inner channel (1780) between the front wall and rear wall that includes a first series of grooves or ridges (1782) disposed in a vertical row in an inner channel surface extending into the channel from the rear wall;
one or more retractable pins or projections (1788) extending through the front wall of the body; and
a mounting stake (1790) having a proximal end and a distal end and defining an axis along its length, said distal end adapted for insertion into a ground or other pliable mounting surface, and said stake having a first series of grooves or ridges (1792) disposed in a row in the direction of the axis in a first outer surface at or near the proximal end, and a second series of grooves or ridges disposed in a row in the direction of the axis in a second outer surface at or near the proximal end, wherein said proximal end is adapted for slidably engaging in its axial direction into the inner channel of the body between the front wall and the rear wall, and the first series of grooves or ridges (1792) of the stake engagable with the first series of grooves (1782) in the inner channel surface of the body from the rear wall, and the second series of grooves or ridges of the stake engagable with the one or more retractable pins (1788) to removably connect the proximal end of the stake into the channel of the body.

2. The mounting of claim 1, further comprising a second series of grooves or ridges (1784) formed in the inner channel surface of the body, spaced apart from the first series of grooves or ridges (1782), and a second series of grooves or ridges (1794) formed in the proximal end of the mounting stake, spaced apart from the first series of grooves (1792), wherein the second series of grooves formed in the proximal end of the stake engages the second series of grooves formed in the inner channel to connect the proximal end of the stake into the channel of the body.

3. The mounting for a decorative article of claim 2, further comprising a third series of grooves or ridges (1786) formed in the inner channel surface of the body, spaced apart from the first series of grooves or ridges (1782), and a third series of grooves or ridges (1796) formed in the proximal end of the mounting stake, spaced apart from the first series of grooves (1792), wherein the third series of grooves formed in the proximal end of the stake engages the third series of grooves formed in the inner channel to connect the proximal end of the stake into the channel of the body.

4. The mounting for a decorative article of claim 1, wherein the slidably engagable blank extends from the decorative article and is adapted to be joined to the body (1712) by sliding engagement of the blank into the slot (1738).

5. The mounting for a decorative article of claim 1, further comprising: the decorative article removably engaged to a slidably engagable blank, with said slidably engagable blank adapted to be joined to the body (1712) by sliding engagement of the blank into the slot (1738).

6. The mounting for a decorative article of claim 1, wherein the slot (1738) comprises a first section of substantially rectangular shape (40) and a blank opening area (42).

* * * * *